United States Patent [19]
Aleia et al.

[11] Patent Number: 5,991,733
[45] Date of Patent: Nov. 23, 1999

[54] METHOD AND COMPUTERIZED SYSTEM FOR MANAGING INSURANCE RECEIVABLE ACCOUNTS

[75] Inventors: Alan L. Aleia, Glastonbury; Donald R. Pierce, Jr., Enfield; Keven J. Busque, Manchester; Ruthann S. Bouchard, South Windsor, all of Conn.

[73] Assignee: Hartford Fire Insurance Company, Hartford, Conn.

[21] Appl. No.: 08/621,026

[22] Filed: Mar. 22, 1996

[51] Int. Cl.⁶ .................................................. G06F 17/60
[52] U.S. Cl. ................................. 705/8; 364/400; 705/1; 705/9; 707/104
[58] Field of Search ................................. 364/400; 705/1, 705/2, 4, 8, 9; 707/104

[56] References Cited

U.S. PATENT DOCUMENTS

| | | | |
|---|---|---|---|
| 4,774,664 | 9/1988 | Campbell et al. | 705/38 |
| 4,831,526 | 5/1989 | Luchs et al. | 705/4 |
| 5,136,502 | 8/1992 | Van Remortel et al | 705/2 |
| 5,191,522 | 3/1993 | Bosco et al. | 705/4 |
| 5,359,509 | 10/1994 | Little et al. | 705/2 |
| 5,444,615 | 8/1995 | Bennett et al. | 705/8 |
| 5,550,734 | 8/1996 | Tarter et al. | 705/2 |
| 5,583,778 | 12/1996 | Wind | 705/34 |

*Primary Examiner*—Edward R. Cosimano
*Attorney, Agent, or Firm*—Arthur L. Plevy

[57] ABSTRACT

A method and computerized system is disclosed for managing insurance receivable accounts. The method provides a combination of specific automation enablers and unique ruled based decision tools which are used to maximize recovery of the insurance receivable accounts. The method includes automation of collection strategies based in part on an automated decision support tool, for objective evaluation of data relating to any collection related decisions or activities, and a historical data warehouse, for comparison to all other insurance receivable accounts recorded. The computerized system entails a local area network of workstations, database server, file server, input devices, output devices configured by software for accumulating, processing, administering and analyzing premium insurance collection accounts in an automated workflow process environment. The computerized system provides, among other capabilities, for cases processed in-house by collectors, automation respecting scripted dispute handling, on-line payment plan capabilities, electronic data transfer and, collection strategy development, for cases referred to an outside collection agency or attorney, automation respecting facsimile generations, legal strategy development, in-house attorney reviews and monitoring, electronic data transfers to local counsel, evaluation of the next step to be undertaken and, access to a bankruptcy database.

47 Claims, 28 Drawing Sheets

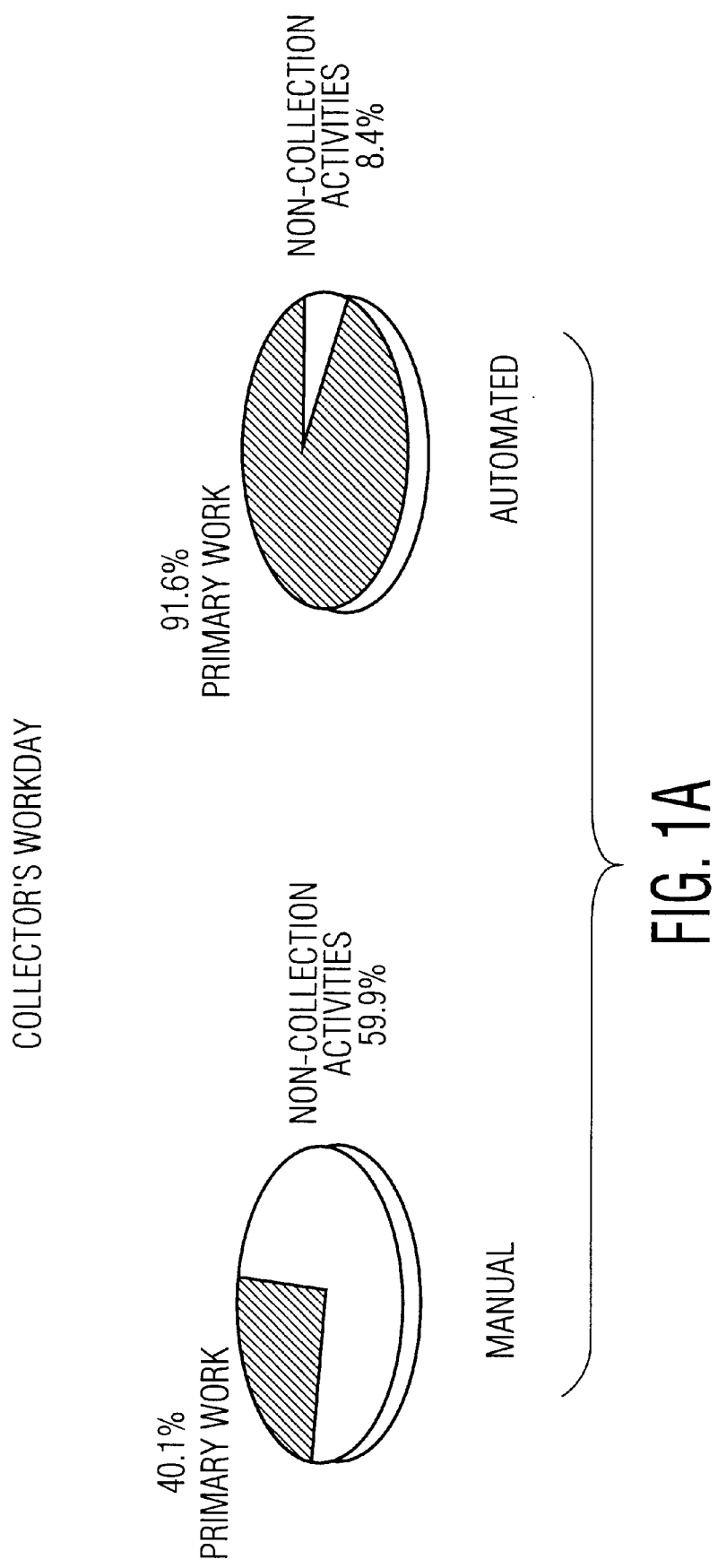

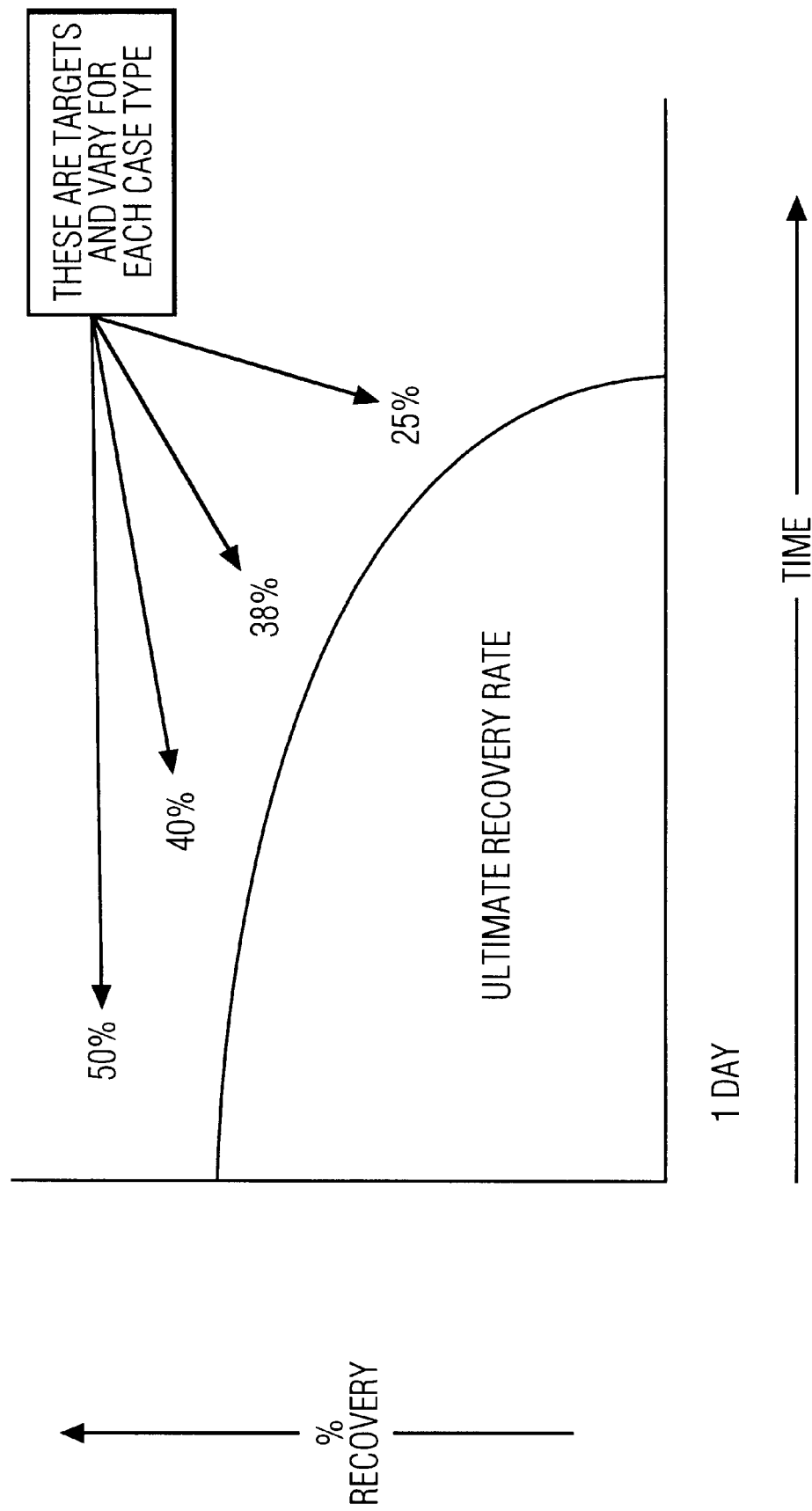

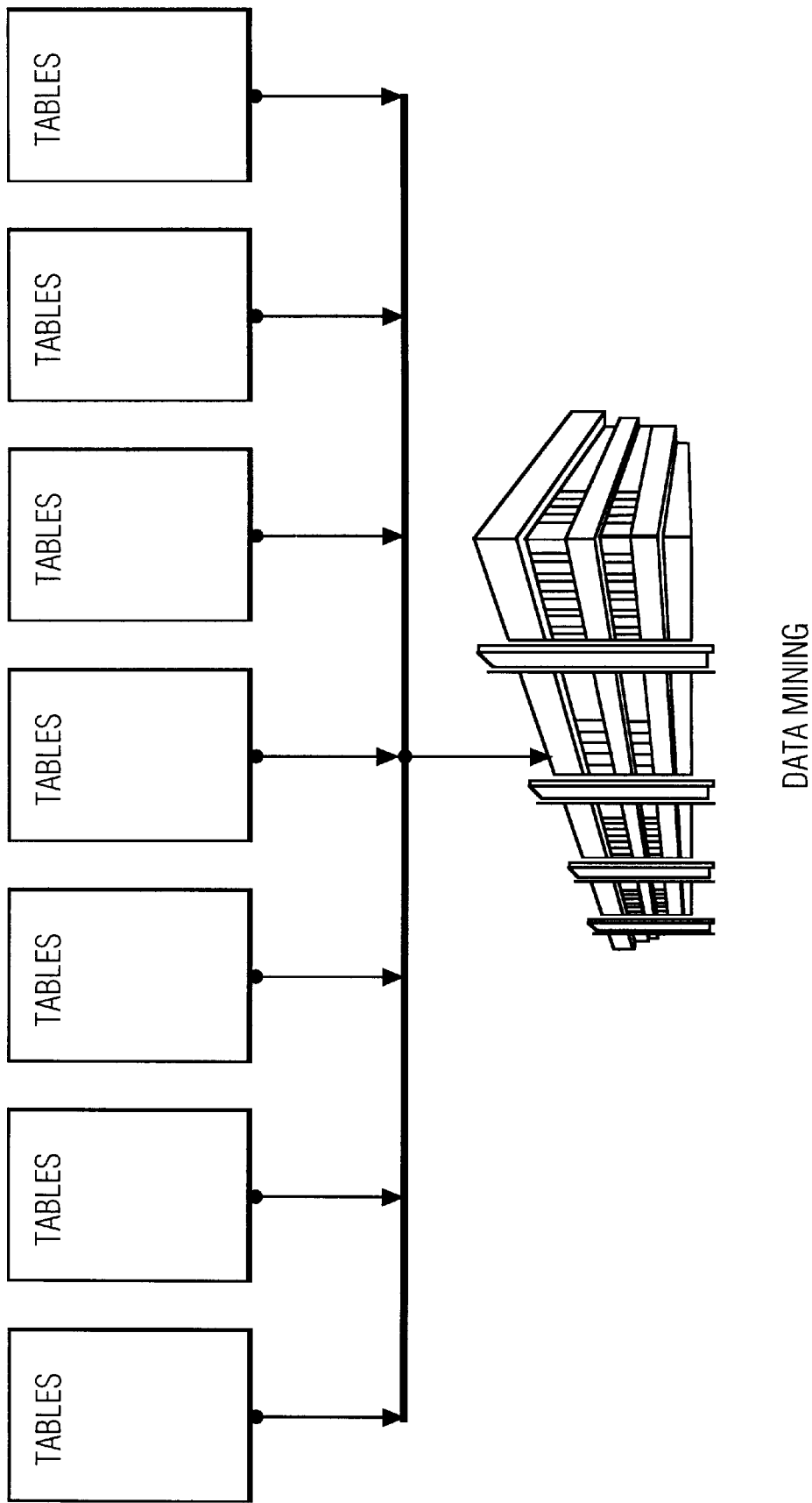

FIG. 1J

AUTOMATED DECISION SUPPORT INPUT

FILE  HELP

DECISION BEING CONSIDERED  [SETTLEMENT OFFER ⇩]

NEXT RECOMMENDED ACTION  [ATTORNEY REFERRAL ⇩]

SETTLEMENT OFFER AMOUNT  [5784.00]

ATTORNEY  [GERALDINE BATTISTOLI ⇩]

○ HOURLY
● CONTINGENT

EST TIME TO RESOLUTION (Mths)  [1]

EST TIME TO RESOLUTION (Mths)  [16]

COST PER DAY  [1.50]

COST PER DAY  [1.50]

DISPUTE TYPE  [BILLING DISPUTE ⇩]

DISPUTE TYPE  [BILLING DISPUTE ⇩]

WEIGHTED AVERAGE PROBABILITY
DISPUTE TYPE IMPACT [.90]  STATE IMPACT [.10]

WEIGHTED AVERAGE PROBABILITY
DISPUTE TYPE IMPACT [.90]  STATE IMPACT [.10]

PRESENT VALUE
INTEREST RATE %  [8]

PRESENT VALUE
INTEREST RATE %  [8]

[CALCULATE]      [CLOSE]

FIG. 1K

AUTOMATED DECISION SUPPORT

FILE  HELP

ACCOUNT ID  AAA030945   NEXT RECOMMENDED ACTION  ATTORNEY REFERRAL
ACCOUNT BALANCE DEBT  $11,658.00   DECISION BEING CONSIDERED  SETTLEMENT OFFER

ACTIVE LOG NOTES

| | DECISION BEING CONSIDERED COST | NEXT RECOMMENDED ACTION COST |
|---|---|---|
| WEIGHTED AVERAGE PROBABILITY OF RECOVERY | | 0.9 |
| PROBABLE RECOVERY | | 10492 |
| ESTIMATED EXTERNAL COSTS: | | 2565 |
| ESTIMATED INTERNAL COSTS: | | 810 |
| PRESENT VALUE OF RECOVERY COSTS: | | 0.891 |
| ESTIMATED NET RECOVERY: | 5784.00 | 6341 |
| DECISION SUPPORT SELECTION: | ☐ | ☒ |

NEW DATA ENTRY

INSERT  DELETE  CALCULATE  CANCEL

CLOSE

METHOD AND COMPUTERIZED SYSTEM FOR MANAGING INSURANCE RECEIVABLE ACCOUNTS

FIELD OF THE INVENTION

This invention primarily concerns a method and computerized system for managing insurance receivable accounts. The invention automates the work in process management of activities associated with collecting on insurance receivable accounts.

BACKGROUND OF THE INVENTION

This invention relates to a method and computerized system for the collection of unpaid insurance receivable accounts. More particularly, it relates to a method and computerized system providing a combination of specific automation enablers and unique rule based decision tools which are used to maximize recovery of past due and/or disputed insurance premium accounts by optimizing key decisions that occur during the transaction life cycle of the insurance receivable accounts.

The insurance service industry expends large amounts of resources, including facilities, equipment and staff, for collecting unpaid insurance premiums. A billing system which referred $107 million of past due premiums for collection included referrals from large and regular accounts making up most of the approximately 57,000 new cases and $65 million of past due premiums referred annually. Premium recovery through direct collection efforts was $38.3 million and charge offs (referrals considered losses) were $22.8 million. Outside legal collection fees were $1.5 million. Over 70 file cabinets were required to store the estimated 1.2 million documents representing active collection cases. A staff of 30 individuals, including 22 collectors and 8 administrative and management personal in support, was maintained to process these collection cases.

A review of the existing collection process revealed that the less time a collector spent in direct contact with a debtor, the greater likelihood a case remained unresolved and the costs to collect increased. The collection process typically consisted of the following steps: a 1st letter requesting payment, a 2nd letter requesting payment, phone calls requesting payment of the debt, a financial background check on the debtor, an asset search, initiation of a suit, pretrial conference, trial, and resolution of the debt. Time and money expenditures increased with a resulting decrease in likelihood of recovery the farther along the collection process progressed through these steps. Lack of automation respecting routine, repetitive collector tasks such as copying, referrals, matching to file, memo generation and retrieving as well as a lack of automated scripted dispute handling, on line payment plan capabilities, electronic data transfer and, collection strategy development took away from the collector's time to spend in direct contact with a debtor.

When the case was referred to an outside collection agency or attorney, the costs to collect dramatically increased and the chances of recovery dramatically decreased. In particular, lack of automation respecting facsimile generations, legal strategy development, in house attorney reviews and monitoring, electronic data transfers to local counsel, evaluation of the next step to be undertaken and, access to a bankruptcy database contributed to dramatic increases in costs to collect and prolonging the case. Consequently, more effective outside referral and litigation management was needed with respect to the steps undertaken by collection agencies and outside attorney's to minimize collection costs.

Prior art fails to teach or suggest the present invention method and computerized system for managing insurance receivable accounts. U.S. Pat. No. 5,444,61 5, entitled "Attorney Terminal Having Outline Preparation Capabilities For Managing Trial Proceeding", issued to Bennett et al concerns attorney terminals having outline capabilities for case evidence, case law and work product for a lawsuit. U.S. Pat. No. 5,136,502, entitled "System For Funding, Analyzing And Managing Health Care Liabilities", issued to Van Remortel et al relates to a system for funding and managing retiree health care benefits. U.S. Pat. No. 5,191,522, entitled "Integrated Group Insurance Information Processing And Reporting System Based Upon An Enterprise-Wide Data Structure", issued to Bosco et al concerns an integrated information processing storage system for processing and supervising a plurality of group insurance accounts. U.S. Pat. No. 4,831,526, entitled "Computerized Insurance Premium Quote Request And Policy Issuance System", issued to Luchs et al concerns a computerized system for processing and preparing applications for insurance and premium quotations and for preparing and writing insurance contracts. Notwithstanding the prior art, there is no suggestion or teaching of the present method and computerized system for managing insurance receivable accounts on through the litigation process.

An object of the present invention is to provide a method and computerized system for managing insurance receivable accounts. More specifically, it is an object to provide a system for substantially automating the work in process management of billing and collection functions for insurance receivable accounts.

SUMMARY OF THE INVENTION

A method and computerized system is disclosed for managing insurance receivable accounts which provides, among other capabilities, for cases processed in-house by collectors, automation respecting scripted dispute handling, on-line payment plan capabilities, electronic data transfer and, collection strategy development, for cases referred to an outside collection agency or attorney, automation respecting facsimile generations, legal strategy development, in-house attorney reviews and monitoring, electronic data transfers to local counsel, evaluation of the next step to be undertaken and, access to a bankruptcy database.

The present invention discloses a method for substantially automating work in process management of a billing and collection function to ensure consistency in application of process, methods and tasks. A "seamless" electronic link is provided between internal collection activities and external vendors, including but not limited to collection agencies and attorneys. The present invention can be used in any segment of the transaction life cycle where multiple activities and decisions occur in a dynamic environment. The present invention includes workflow management for the functions performed by a billing department, and provides an electronic link for management of several departments, together with outside vendors, collection agencies and attorneys to optimize the series of activities that occur in all the systems. The present invention substantially improves productivity by recommending that actions executed are those with the highest probability for a successful resolution. The actions recommended under the present invention minimize time spent on unproductive activities and direct activity to tasks that are proven effective in contributing to resolution, thereby increasing productivity.

Specifically disclosed is a method for automating work in process management of insurance premium receivables or collection accounts including assigning a collection strategy for assisting recovery of the insurance receivables. The collection strategy is in part based on an automated decision support tool providing objective evaluations for any decision considered or made for the insurance receivables. The collection strategy is also based in part on a historical data warehouse comparison of the insurance receivable being processed against prior insurance receivables recorded in the historical data warehouse.

Specifically disclosed, also, is a computerized system including a plurality of microprocessor based workstations, a database server, a file server, and printer, fax/modem, or facsimile equipment configured and interconnected in a local area network (LAN) manner and configured by software for managing insurance receivable accounts. The computerized system is also interconnected to outside database resources such as collection agencies, NCCI, and bankruptcy databases through the fax/modem capabilities over telecommunication lines such as telephone networks. The computerized system, in addition to having software facilitating the LAN configuration, has software configuring the computerized system to provide automated management functions including workflow processing for managing insurance receivable accounts.

BRIEF DESCRIPTION OF THE FIGURES

The invention will be better understood with reference to the following illustrative and non-limiting drawings, in which:

FIG. 1A is a pie chart comparison of collector's activities in a manual and an automated collection system.

FIG. 1B is a graph of recovery rates versus time the collection case is outstanding.

FIG. 1H illustrates the table structure of data in the data warehouse.

FIG. 1I is illustrates strategy assignment scenarios.

FIG. 1J is an automated decision support input screen for a settlement offer in accord with the present invention.

FIG. 1K is an automated decision support screen for considering a settlement offer, in accord with the present invention.

DETAILED DESCRIPTION OF THE INVENTION

The present invention discloses a method for substantially automating work in process management of a billing and collection function to ensure consistency in application of process, methods and tasks. A "seamless" electronic link is provided between internal collection activities and external vendors, including but not limited to collection agencies and attorneys. The present invention can be used in any segment of the transaction life cycle where multiple activities and decisions occur in a dynamic environment. The present invention includes workflow management for the functions performed by a billing department, and provides an electronic link for management of several departments, together with outside vendors, collection agencies and attorneys to optimize the series of activities that occur in all the systems. The present invention substantially improves productivity by recommending that actions executed are those with the highest probability for a successful resolution. The actions recommended under the present invention minimize time spent on unproductive activities and direct activity to tasks that are proven effective in contributing to resolution, thereby increasing productivity. Use of the present invention has increased staff productivity by 129%, as shown in FIG. 1A, where in a manual environment 59.9% of the collector's workday is spent on non-collection related activities, but in an automated environment under the present invention only 8.4% of the collector's workday is spent on non-collection related activities.

The invention includes automation enablers, decision support tools, structured work flows (scripts, rules, canned letters, templates, expert intervention) and an electronic link between internal staff and external vendors that are utilized throughout the entire transaction life cycle to collectively form the basis for an integrated process for recovery of premium that is unique in the industry. The electronic link technology can be accomplished by modem, image processing, desk top teleconferencing or some other method.

The present invention pertains especially to insurance receivable accounts including premium collections, claims subrogation, third party deductibles, reinsurance medical overpayments and other insurance lines but is applicable to other types of receivables as well.

Figure 1C:
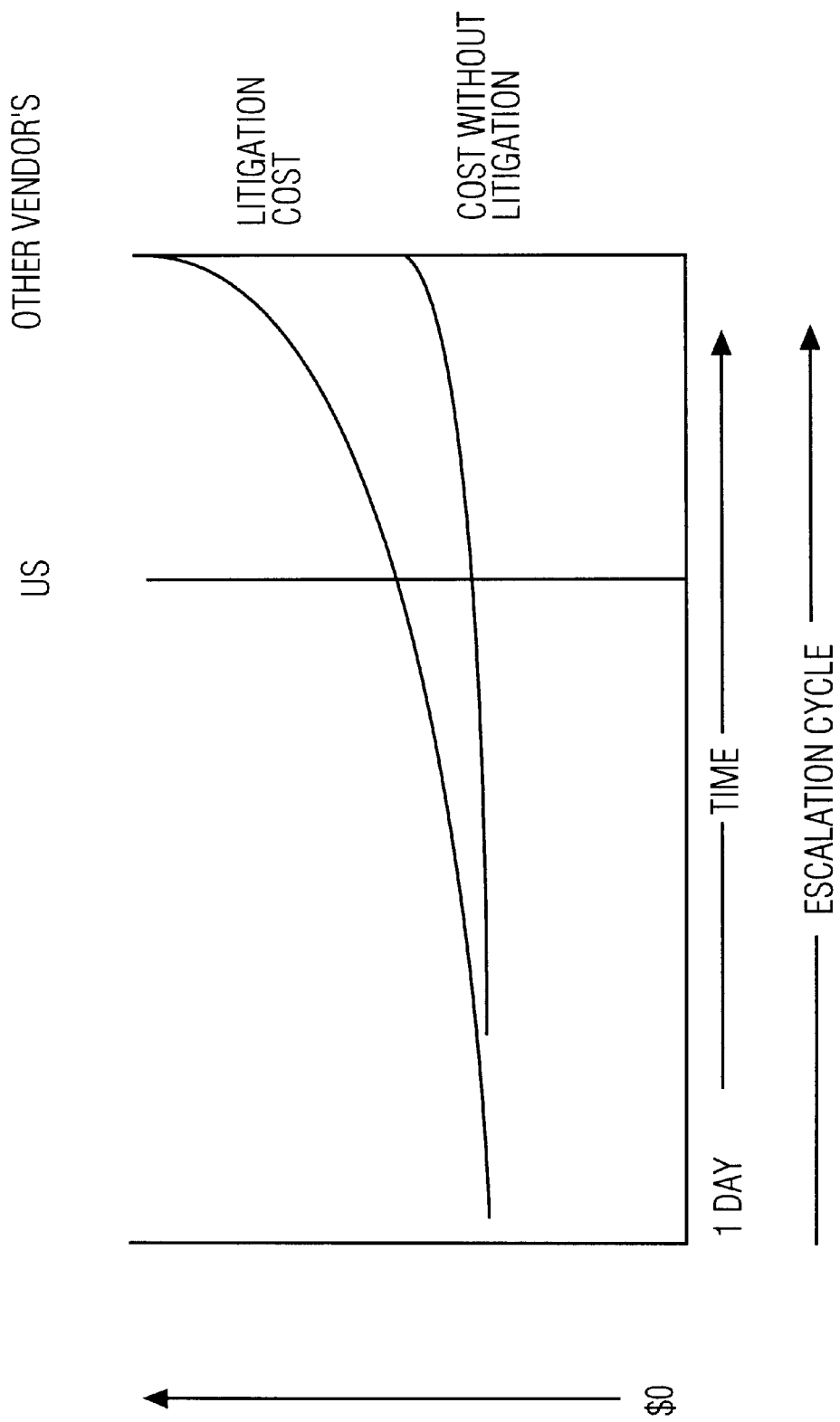
FIG. 1C is a graph comparing costs with and without litigation.
Figure 1D:
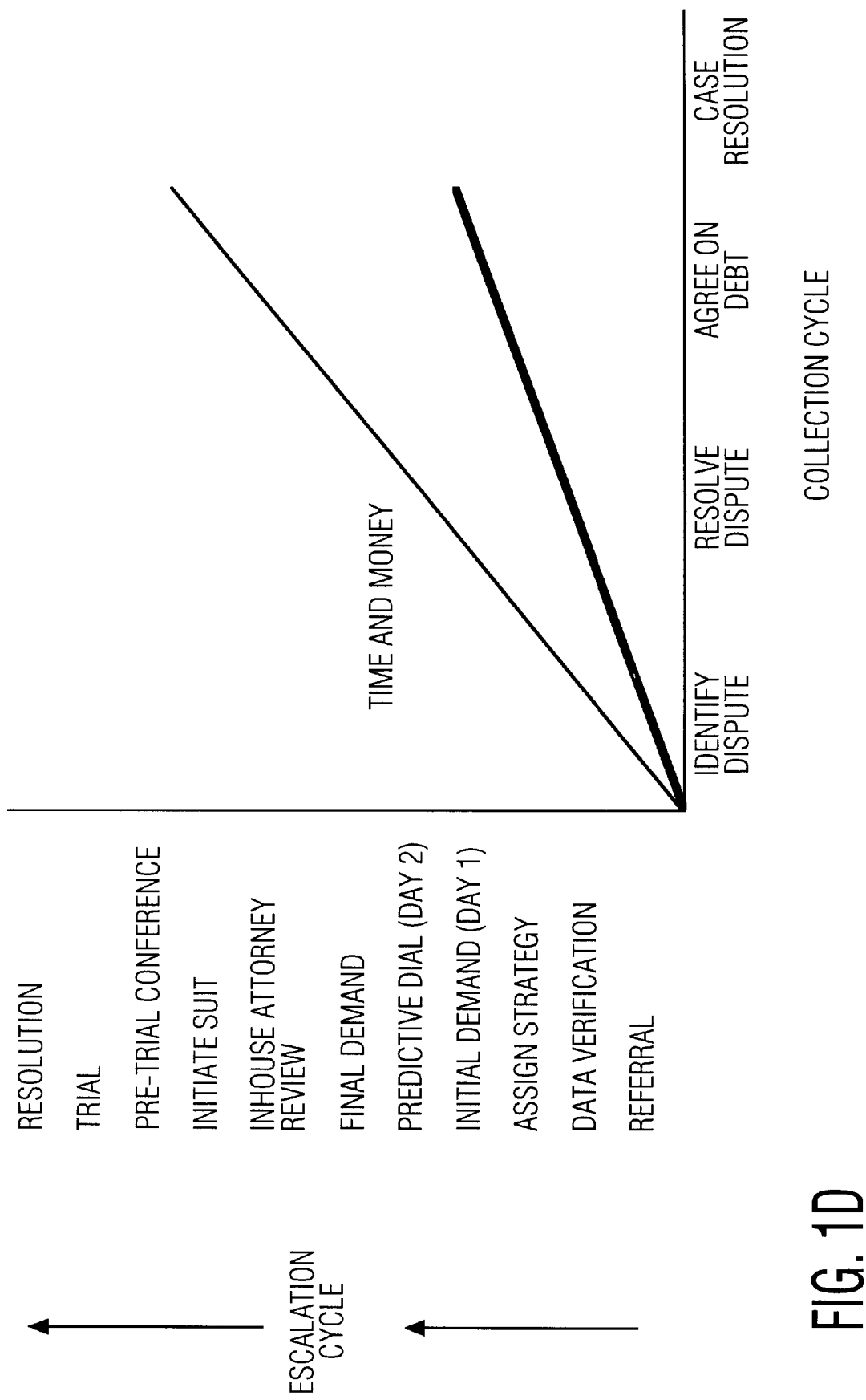
FIG. 1D is a graphic chart of the business model relating the time and money expenditures to collection activities.

The present invention was designed to recognize and manage the two key forces impacting the ultimate recovery of a receivable: time and "escalation" costs. Both of these are directly related to how quickly a recovery is made and the amount of recovery. The management of these forces becomes the basis for the business model the present invention is designed around. The longer a case is unresolved, the higher the potential for a debtor to skip, go out of business, declare bankruptcy and squander funds, thereby reducing the potential amount available for recovery, as shown in FIG. 1B. The longer a dispute is unresolved the higher the customer frustration level and more likely that escalation to outside collection agencies and attorneys will be necessary to resolve differences. Use of collection agencies and attorneys substantially increases cost, as shown in FIG. 1C, thereby reducing the potential net recovery. Therefore, optimization of tasks to achieve quick resolution will minimize the time a receivable is outstanding, thereby minimizing both internal and external costs and maximizing the potential recovery. The collection process for a single account consists of a series of actions that involve "settle or escalate" decisions. In the manual environment these decisions are made independent of other actions and prior decisions. The variables are too numerous to effectively manage manually. Staff productivity cannot be improved and financial outcomes cannot be objectively predicted relative to the effort expended or prior experience in a manual environment. The goal of the present invention is the quantification and objective evaluation of voluminous data to guide decisions that could impact the time line by escalation of activity. The transaction life cycle therefore, now becomes controllable under the present invention, dependent upon the optimization of the business model represented by the "Collection and Escalation Cycle" shown in FIG. 1D.

Given that an average collector's case workload may approach 500 cases, manual implementation of routine, repetitive tasks takes time away from the collector's ability to spend in direct contact with a debtor. If the timing and quality of escalation can be optimally managed, the chances of shortening the time a case is outstanding improve. This would lead to an improved recovery rate and the controlling of escalation costs. Automation serves to manage this process, reduce escalation costs and improve ultimate recovery by reducing the time a case is outstanding. Automation provides management with the flexibility to adjust staff levels (and therefore individual case load) in response to referral volumes to maximize recovery rates.

With an automated system providing integrated image processing, the collector manages cases from a professional workstation rather than a filing cabinet and a terminal. The windowing capabilities of the collector's workstation allows multiple host, image display and word processing sessions to be active at one time. An integral part of each case on the automated system is an activity log. The activity log automatically capture all actions taken on a collection case by the billing system, or by the collector. As a byproduct of adding an entry to the activity log, follow-up diaries are generated, management operating statistics (MOS) captured, and entries in the activity log linked to electronic images or text.

The automated system has a collector's electronic in-box (also referred to as the collector queue) for containing the current day's assignments. Entries in the in-box come from follow-up diary activity, incoming correspondence, financial updates from a billing system and approval messages from the collector's supervisor. When an entry in the in-box is selected, the activity log for the case is presented with a menu of options for automating the steps of the collection/ escalation cycle. Some of the options include a structured letter writing tool for composing and sending letters, an on-line form tool for automating paper based forms and also an automatic dialing and script calling facility for phone contact with debtors.

Supervisory staff are alerted when certain situations arise in the processing of a case that requires attention and follow up or authorization for escalation. Management supplied parameters to the system are used to prioritize and distribute the workload among collections staff. The collection and escalation cycle is structured, monitored and managed by and through the computerized system. This enables the computerized system to do break even analysis to determine whether it is economically beneficial to try to collect from a debtor based on the costs incurred thus far, costs to escalate to the next step, and the probability of collecting based on time and experience parameters.

Although the present invention can be used in many different applications where collection of unpaid billings or accounts is improved by automation of repetitive, routine tasks and litigation management, the present invention is especially suited for processing insurance receivables. Accordingly the present invention will be described in conjunction with the hardware/software embodiment of FIG. 1E, FIGS. 1F through 1K, the software structure derived from the function chart of FIG. 1I, and the schematic workflow chart of FIGS. 2 through 17.

Figure 1E:
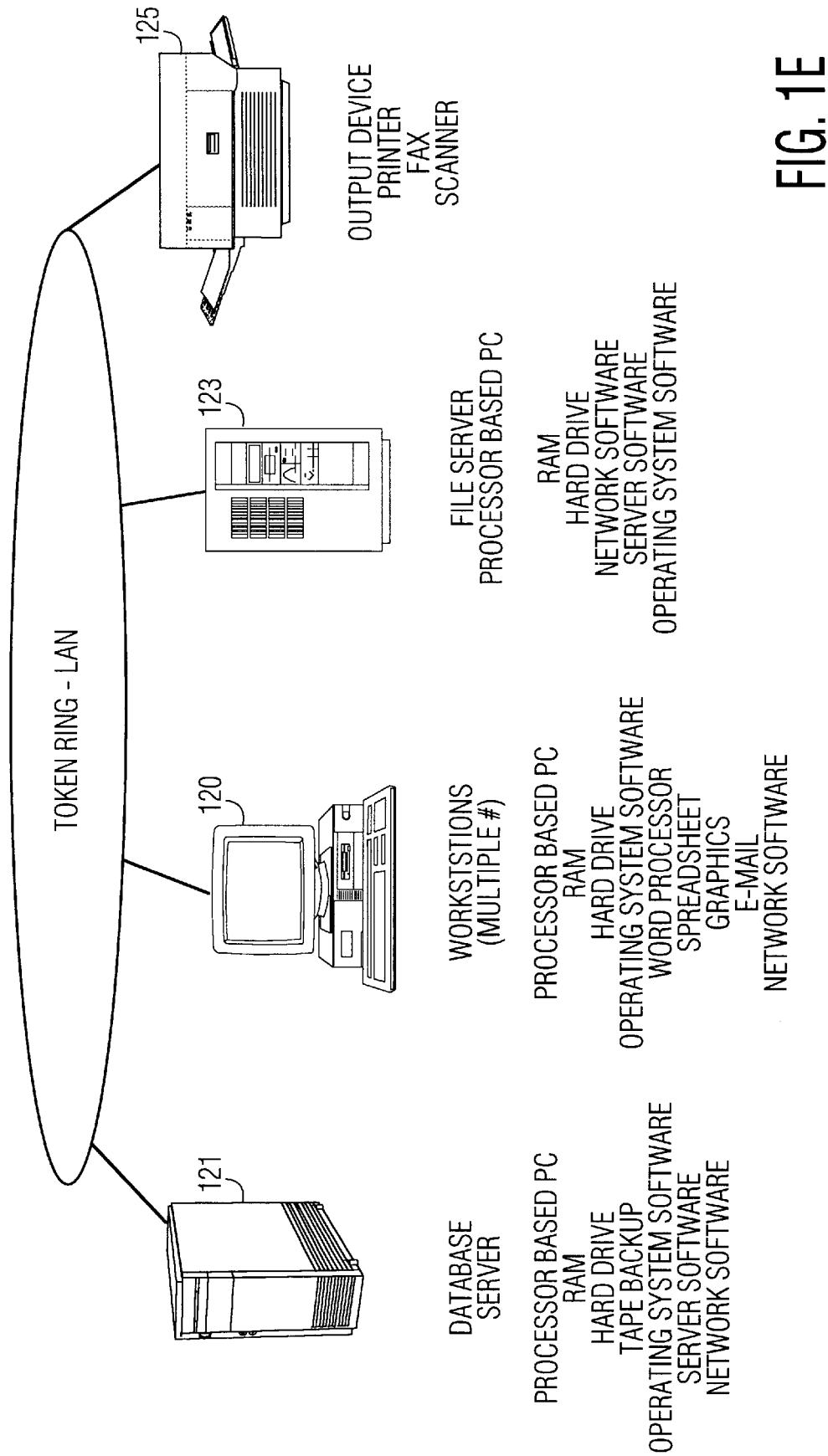
FIG. 1E is a configuration of a network hardware and software embodiment in accord with the present invention.

The preferred hardware and software embodiment of the present invention is depicted in FIG. 1E. Preferably, the local area network (LAN) of workstations 120, numbering about fifteen, are interconnected to a database server 121, a file sever 123 and output devices 124 in a token ring formation. Preferably, the four megabits per second token ring network is in accord with IEEE standard 802.5 which can accommodate mainframes as well as microcomputers. Other forms of LANs which can be utilized are bus and star networks. The LAN can be networked (electronically interfaced) to a mainframe billing system (such as the PACER mainframe for agency billings) for automated collection referrals.

The workstations (workstation processor means) 120 are preferably microprocessor based personal computers with suitable capacity RAM, hard drive, operating system software, network software, a word processor, spreadsheet, graphics and electronic mail software. Individual collectors or managers would access and operate in the system through the workstations which have a monitor for video display and a key board for manual inputs to the system through the workstation. Suitable workstation hardware, for example, includes an IBM PS/2 90-0lf, 16 mb RAM, 400 mb hard drive, with software that includes DOS, Windows, Norton Desktop, Microsoft Office (Word, Excel, Powerpoint), and e-mail for Windows.

The database server (database processor means) 121 and file server (file processor means) 123 are preferably microprocessor based personal computers with suitable RAM, hard drive, tape backup, operating system software, network software, and server software. The database server 121 and file server 123 are responsive to each of the workstations 120. The database server 121 stores data and processes data requests by all the workstations on the network, including any mainframes that might be connected to the network. Predetermined data such as statistical data, NCCI customer account data and collection generated data can be stored onto and accessed from the database server 121. Suitable database server hardware, for example, includes an IBM PS/2 95-0MT, 16 mb RAM, 1 gb hard drive, 4 mm Dat tape backup with software includes OS/2, SQL or Oracle Server and Netware 386 Runtime.

The file server 123 is dedicated to storing and managing predetermined collections of data such as network shared files and collections of stored information (i.e. data accumulated in processing collection referrals), as simultaneous requests are received from the workstations for access to the files. The collection case files organized by debtor account numbers are among the files processed by the file server. Suitable file server hardware, for example, includes an IBM PS/2 80-321, 16 mb RAM, 650 mb hard drive, and software includes Netware 386 Runtime.

Among the input devices (input means), not shown in FIG. 1E, which can be connected to the LAN are an optical scanner, fax/modem, and facsimile for receiving predetermined input into the computerized system. The system receives inputs through an optical scanner connected to the network with optical character recognition software for inputting text or graphics on hard copy into the system. Through a fax/modem device connected to the network, the system receives electronic data transfers including access to third party data in databases on other local area networks or mainframes outside such as collection agencies, NCCI, and cases filed with various local and federal courts such as bankruptcy. The fax/modem provides the LAN access through telecommunications networks such as telephone networks. The input devices are responsive to each of the workstations.

Among the output devices (output means) 124 preferably connected to the network are a printer for producing documents such as letters and memos (i.e. in text mode or graphics mode) and a fax machine (i.e. in electronic transfer mode) for electronically transmitting and receiving documents. The output devices are responsive to each of the workstations.

The computerized system, including the workstations, database server, file serve, input means, output means are configured by software means (program coding) for managing the insurance premium collection accounts. The software means structure and methodology is based on the function chart of FIG. 1C including the workflow process chart of FIGS. 2–17. The software means can reside in whole or in part in the file server 123, each of the workstations 120, or database server 121. The program coding for the software means may be implemented with existing program languages including C, Pascal, Basic, assembler, etc. implemented in a structured or object oriented manner.

The present invention's usefulness extends beyond internal handling of disputed accounts and is applicable to optimizing the actions of vendors, collection agencies and local counsel (external resources) hired to help in the collection of the receivable. This is accomplished by tailoring and directing the specific initial actions to be taken by external resources, through the seamless electronic link which provides a dynamic response between internal and external resources through electronic communication and data transfer. Under the present invention, recommended actions are made to external resources during the transaction life cycle based upon objective evaluation of all available data and the results of decisions made on prior, like cases, as recorded in the data warehouse.

The utilization of past decisions (outcomes), as stored in the "Historical Data Warehouse", is a critical element of the invention. As explained later, this data is used to:

assign strategies to new cases, 139;

assign cases to staff with specific skills, 134;

measure the productivity of staff;

measure financial results, and;

determine "Predictive Outcome value".

"*Historical Data Warehouse*"(FIG. 1F) is defined as the totality of data elements in all the tables and the recorded outcomes of all the associated actions taken during the transaction life cycle of all the cases stored in the system. This data is used in conjunction with the analysis of the account profile 140 and customer profile 132 on new cases to perform diagnostic analysis when the delinquent accounts are first referred for collection, prior to commencing any activity and again at any subsequent point through conclusion of the case to extrapolate a most likely outcome that will result upon execution of any next contemplated step.

The automated diagnostic analysis of new accounts 142 first referred for collection under the present invention, the strategy assignment and evaluation of existing accounts periodically through out the transaction life cycle will:

keep the process dynamic;

call up actions successful in the past on like accounts and ignore unsuccessful ones;

assign a strategy 139 (a string of actions or tasks 135) to the new account; and, make the process sensitive to changes in the external environment.

The ancillary benefits of this process are:

improve decision making, improve upon credit risk decisions, reduce exposure to a delinquent receivable, and, influence underwriting and premium audit standards and techniques.

Once the collection strategy is assigned to a new case and prognosis made for the probable outcome a "Predictive Outcome Value" (POV) is derived. The POV is the projected cost/benefit of successfully executing the prescribed strategy to the predicted outcome. The POV considers internal cost, and expected external escalation costs, factors associated with the strategy, the probability of success, the recovery amount and time period (present value) to achieve the desired result so that net recovery can be calculated. This feature ensures optimization of resources to highest return activities. This is one of the key benefits of the invention and an innovation that does not otherwise exist, to our knowledge, in the industry.

The tactical objective of POV is to optimize staff productivity by prioritizing their activities on those cases with the highest probability of successful case resolution. The POV is used to prioritize tasks to be worked relative to other tasks in the staff work queue. The POV can be expressed in various ways, such as highest dollar value, shortest time frame to resolution, a percent return based on cost, least likely to result in litigation or other preset criteria, and/or a combination of the preceding. Therefore the ability of the present invention to dynamically profile the cases in the staff work queue according to POV optimizes the application of resources and activity to work load with highest return potential.

Another unique feature of the present invention, and a significant difference from known methods, is the concept of "Adaptive Control" as applied to managing Insurance Premium Collections. The concept of adaptive control has existed in the machine tools industry, electronic process design, aircraft engines etc. This knowledge and these same processes have not previously been integrated into the insurance industry or the collection of insurance receivables.

The principle of adaptive control as it applies to the present invention, is the creation of a "Feed-Back Loop" (FIG. 1G) that responds to key variables depending on the quantitative changes occurring within both internal & external processes. The result is to direct decisions to optimum outcome results. This is particularly useful in an environment where many external factors are changing and methodologies must evolve to optimize recoveries.

Figure 1F:
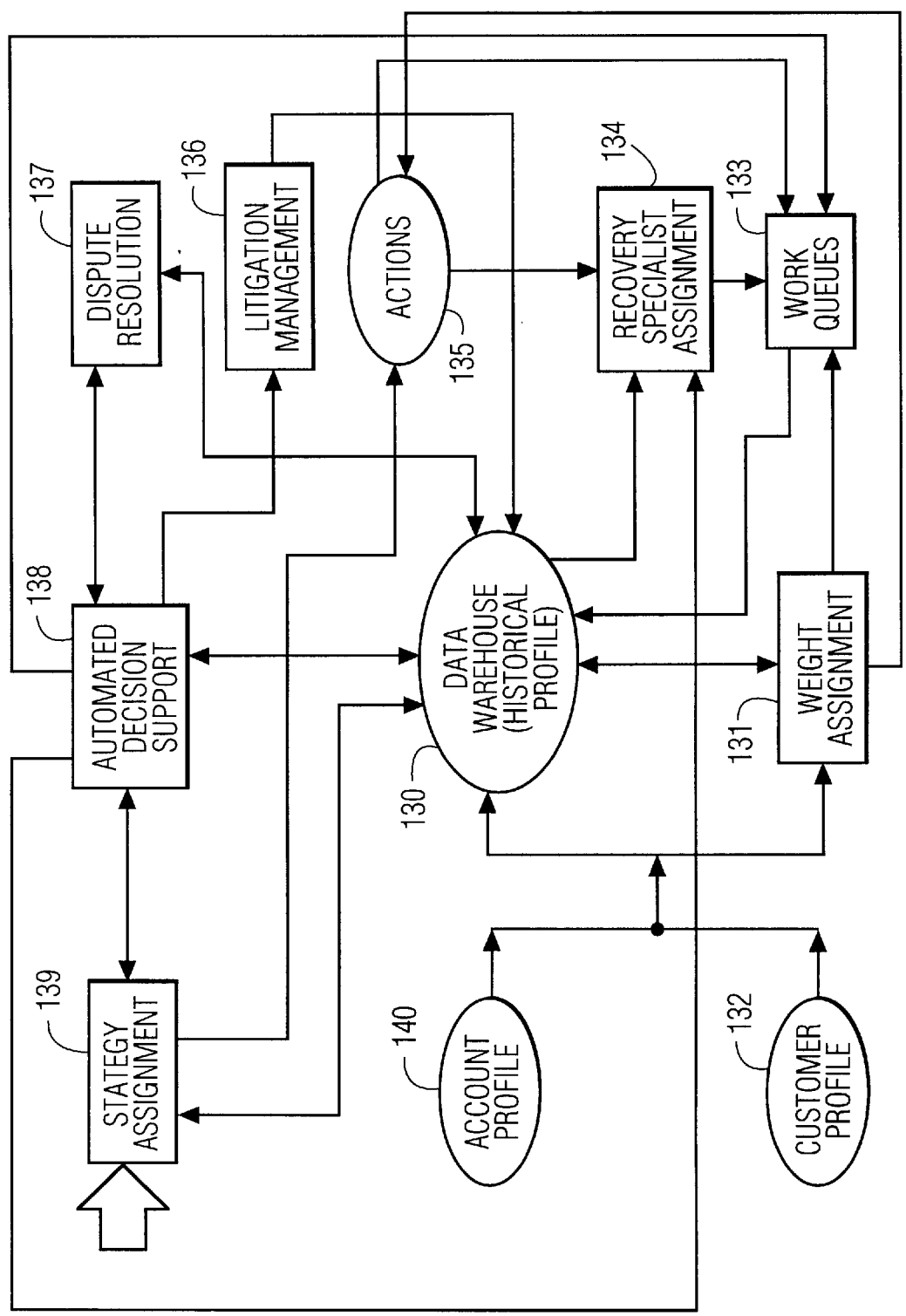
FIG. 1F illustrates the dynamics of strategy assignment in accord with the present invention.
Figure 1G:
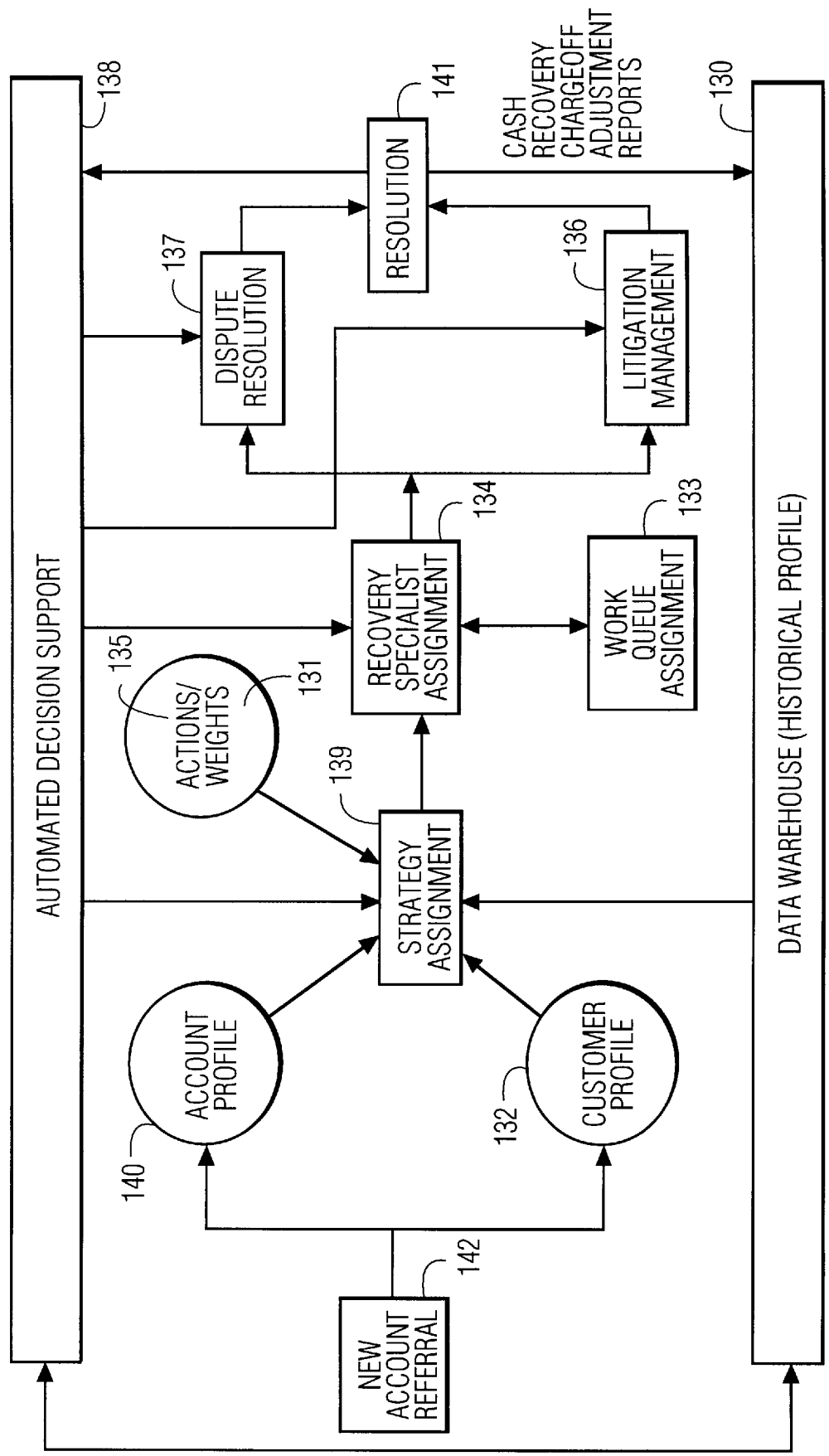
FIG. 1G illustrates the dynamics of automated decision support and data warehouse functions in accord with the present invention.

The adaptive control engine of the present invention, as shown in FIG. 1G, illustrates how the Data Warehouse (Historical Profile 130) is searched for optimal relationships between the following objects:

Account Profile 140,

Customer Profile 132,

Weight Assignments 131,

Strategy Assignments 139,

Action Items 135,

Litigation Management 136,

Dispute Resolution 137,

Work Queues 133,

Recovery Specialist Assignments 134, and,

Resolutions 141.

The Adaptive Control and data mining feature of the historical data warehouse is utilized to show the correlation between account and customer profile, strategy and weight assignment, recovery specialist, point of origin (State), and type of business, etc., with all the actions implemented to bring the case to resolution. The present invention compares these factors when the account is first referred to it with the composite profile of like cases that were successfully resolved and stored in the data warehouse to compose an initial strategy assignment and to derive a POV of the new case. As the work commences and moves through logical and defined stages toward recovery ("Collection/Escalation Cycle") (FIG. 1D), the Automated Decision Support tools discussed later ensure consistent application of activities and tasks supported by quantifiable and objective criteria used to develop and execute presented tasks; thereby controlling costs as the case proceeds to resolution.

The adaptive control engine is further supported by various "data mining" engines to support developing algorithms & associated relationships of the variables from the data warehouse (historical profile, FIG. 1H)). Therefore the intelligence of the collectors and management staff and external factors in resolving delinquent receivables (a form of smart process) is used to modify the processes impacting the optimum outcome in the premium collection process. In addition, the external paradigm development is constantly modifying the objects previously discussed to achieve optimal performance.

The salient business objectives of adaptive control and data mining innovations of the present invention are as follows;

to affirm that cases with the highest potential of success are identified and prioritized in the work queues, to optimize the decisions made to resolve the account throughout the entire transaction life cycle, reduce the length of time a delinquent receivable is outstanding, lower internal and external costs, maximize recoveries, and, improve Decision (Credit/Risk) Support Information.

A "collection strategy" is a predefined scenario of activities and time lines based on various criteria such as dispute type, line of business or dollar amount (FIG. 1I). Collection strategy assignment 139 is accomplished automatically by the system as a result of the data mining process 130 previously discussed whereby, successful outcomes from like cases are used as the template for new cases with similar attributes. Strategies can also be manually assigned. The main purpose of a collection strategy is to assist the collector in managing an account through the collection and escalation cycle toward resolution. Typical actions associated with a strategy are;

letters (Demand, Attorneys, etc.), phone calls, collection agency referral, attorney referral, payment plan request, promissory note, refer to manager, refer to expert or regional entity, charge-back to NCCI, request for disbursement, transfer reversal, and, refer to attorney for suit.

The assignment of strategies and actions are influenced by the following relationships which the system uses to search for correlation to outcome:

Historical Profile,

Dollar Value,

Dispute Type,

Original Billing Mode,

Customer Stated Criteria, and,

Managers Judgment.

When a new delinquent account referral is received from the billing department, a strategy is automatically assigned to the account based on predetermined criteria such as:

Which customer is the account for?,

What type of Contract is it?,

How much is the Account balance?,

What strategy has been successful in the past?, and,

Who has been successful working this strategy in the past?

The adaptive control and data mining engines review the historical data base to determine which actions contribute to the success factors. In addition, the "AD-HOC" activities of the collectors in defining strategy and actions is also integrated into the dynamic model. The ability to optimize these variables via feed-back from the data warehouse creates a leveraging mechanism to enhance the collectors efficiency and effectiveness. These actions also generate a least cost scenario. Examples of simple collection strategy activities are the following:

create a demand letter to the debtor;

if no response, follow-up with a phone call;

if no agreement, refer to collection agency; and, if agency unsuccessful, refer to an Attorney.

All actions and cases are automatically assigned "weights". The weight assignment 131 represents a value based upon relative complexity, dollar value, the specific steps to complete, relative resource requirements, and so on. Weight assignments 131 are accumulated for the new case to derive a relative indication of work effort which is used by the system to assign new cases to staff based upon predefined criteria. Workload and assignment can be measured in terms of weighted value of cases, strategy, customer type and so on. This innovation allows consistent measurement and ability to distribute workload in response to new referral activity and to respond to external factors which change complicity of the actions required.

Automated Decision Support (ADS) 138 is a tool which provides objective evaluation of data relating to any decision point in a specific case's life cycle. ADS eliminates the need for conjecture by documenting and objectively evaluating numerous and complex data that support a decision. ADS provides the collectors, throughout the entire transaction life cycle, with the following:

A tool to help the collectors to make a decision on whether or not to escalate a premium collection case to an outside collection agency, initiate litigation, accept a settlement, create a charge-off or some other action (FIG. 1F);

Objective and quantifiable criteria for sending an account to the most efficient, lowest cost alternative for case resolution; this routing capability is derived from a detailed Cost Benefit Analysis performed by the ADS Process.

To achieve these objectives, ADS consists of:

an intelligent "Driver" at every escalation point;

utilizes historical information to predict success and dollar value of outcome;

captures cost incurred to date and projects future costs based on next recommended actions;

compares the projected outcome with the cost to proceed to guide the decision process on whether the contemplated action should be executed; and, performs sensitivity analysis for any of the variables.

The above can best be illustrated by an example shown in FIGS. 1J, 1K. The collector is negotiating with a debtor for settlement of the case. The account balance is $11,658. Contract status on first contract in-house. The recommended escalation action if the account is not settled is to refer the account to an Attorney. (Look at activity log for next diaried action with an action of escalation (ESC).

The debtor offers a settlement of $5,784.00. The collector inputs the decision support action (DSP) on the activity log for that account. By inputting the note, a new screen comes up with the following information (FIG. 1J):

decision being considered, chooses settlement offer from the drop down list box, enters settlement offer ($5,784.00), completes rest of items in list, and, next recommended action.

If the next action is an attorney referral (per the collection strategy), the collector will select an Attorney recovery specialist (with job type attorney). The collector will be prompted to input whether this is an hourly or contingent account if the data is not already stored in the system. If contingent is selected, the present invention will calculate the cost from the attorney cost table. The system uses the data warehouse to provide the appropriate estimated time to resolution, cost per day, dispute type, weighted average probability outcome and Present Value. Overall in comparison with successful outcomes for like cases stored in the system.

The Automated Decision Support (ADS) model will determine the recommended decision as illustrated in FIG. 1K. In this particular example, the ADS recommends the most cost effective solution is referral to an attorney.

The adaptive control engine augmented by the data mining algorithms permit Process to continually feed-back the aggregate intelligence of the collectors, management, external vendors and past decisions. The impact of market forces, regulating agencies, demographics and shifting financial resources can alter the ADS model over time to keep the collection's process dynamic.

The Resource Management (Internal and External) work flow manager impacts the workings of the internal staff. The impact of Weight Assignments on the prioritization of tasks has already been discussed. In addition, better workload distributing for staff is accomplished by optimal distribution of the case load within the staff pool. As the number of cases increases and decreases, the resource requirements can be predicted from the standards developed from the different case & customer profiles. These labor standards will be modified as the data mining reveals changing relationships for a certain outcome probability.(FIG. 1H) Numerous staff reports and productivity measures can be obtained from the system with this feature.

The same optimization methodology used for internal staff applies to external vendors, collection agencies and attorneys. By data mining the information from all the external sources used, not only are the optimal strategies and actions derived, in addition, optimal workload can be measured. By managing these resources at this level of detail, the most successful agencies will be retained and their effectiveness further enhanced by directing their resources to avoid duplication and to ensure a logical and coordinated escalation of activity at the lowest cost.

Because legal fees can be substantial in the final resolution to any case, the need to optimize the litigation management process is critical. The same methodology described for the collection agency management is applied to litigation management. As the POV of each case is analyzed via data mining of the data warehouse, selection of the most cost effective legal strategy will be identified. By reviewing the results of the data mining models and sharing these results with the selected lawyers, further optimization of performance is achieved.

Figure 1L:
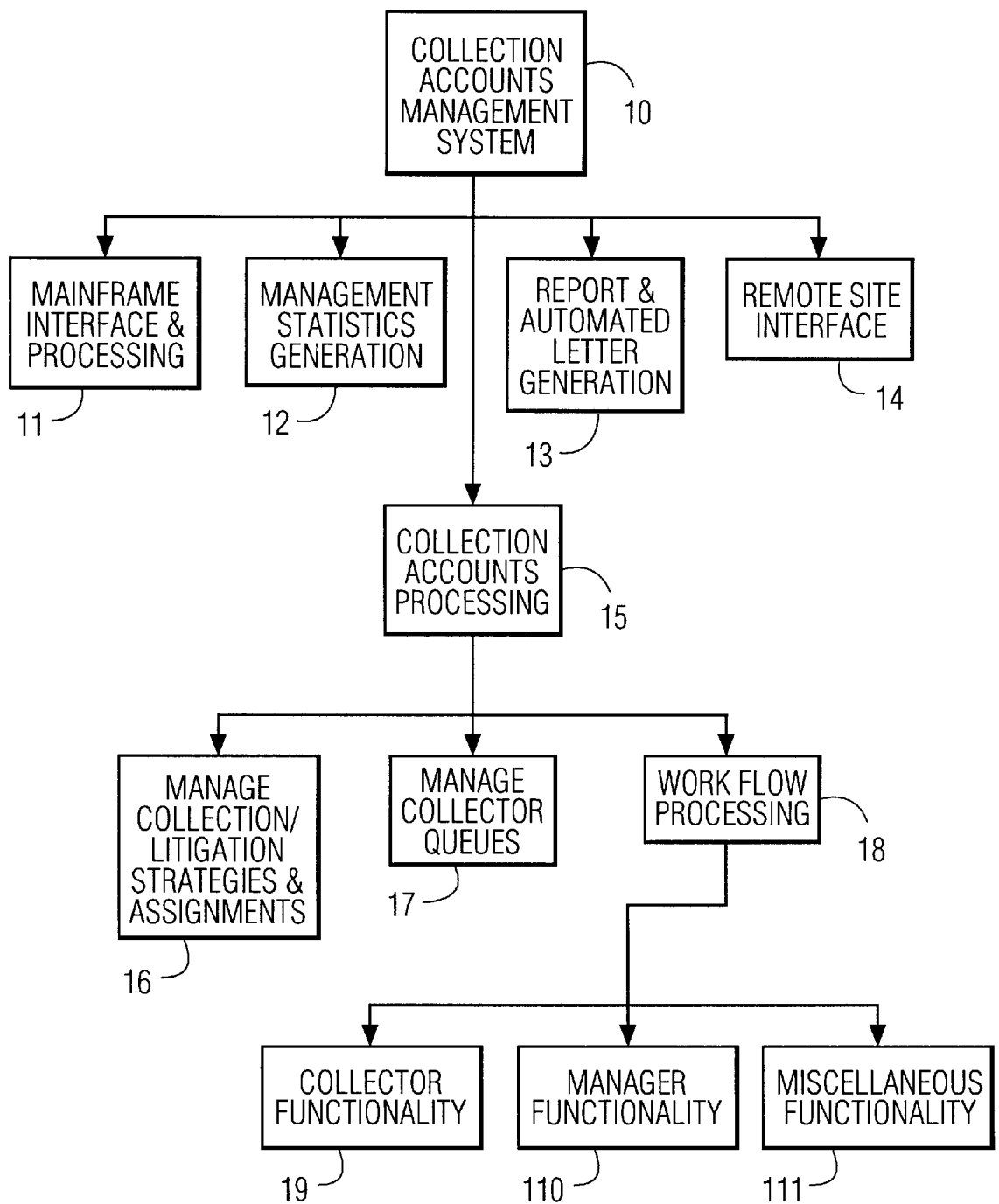
FIG. 1L is a function chart of the present invention computerized system and method.

Referring now to FIG. 1L there is shown a function chart for configuring the present method and computerized system for managing insurance receivable accounts. A computerized system and method providing these functions and capabilities achieves the objectives of the invention as discussed above. The overall management processing function 10 of the present invention computerized system for insurance receivable accounts is to accumulate, process, administrate and analyze the receivable accounts. The management processing function 10 includes a mainframe interface and processing function 11, a management statistic generation function 12, a report and automated letter generation function 13, a remote site interface processing 14, and a collection account processing function 15.

The mainframe interface and processing function 11 of the computerized system provides: the downloading of financial data pertaining to collection accounts from the PACER mainframe (reference to a system for billing insurance agents directly); the downloading of other key data elements from other mainframe systems and local area network based systems; the overnight application of data to the system data base residing in the database server 121 and work queues (activity lists for a collector) residing in the file server 123; and application of an account to a respective work queue determined by the collection strategy assigned by the system and staff workload parameters. A work queue being a list of accounts or activities to be accomplished by a collector or group of collectors.

A management statistic generation function 12 provides overnight creation of statistics needed for management operating statistics (MOS) needed to determine adequate collector staffing and other informational needs which can be accessed to on-line or in report format.

The report and automated letter generation function 13 provides: automatic creation of daily or monthly reports used by collectors or managers; query capability for the ad-hoc reporting of collection account data and statistics; and uploading of data for automated letters and documents to a mainframe computer in another location for printing.

The remote site interface processing 14 function of the system provides: inquiry capability to off-site locations such as collection agencies and attorneys; capability to import data from off-site locations to the present invention computerized system database in a cut and paste environment. Various services provide financial and corporate structure reporting services for business entities and individuals if available.

The collection accounts processing function 15 which provides a work in process environment for collectors and managers includes a manage collection and litigation strategies and assignment processing 16 function, a manage collector queues processing function 17, and a work flow processing function 18.

The manage collection and litigation strategies and assignment processing 16 function provides an on line ability to revise criteria for assignment of collection and litigation strategies. A collection strategy is a predefined scenario of activities and time lines based on various criteria such as dispute type, line of business, or dollar amount. Typical activities would be the generation of automated letters, the establishment of diaries to prompt the collector, and the referral of an account to an outside agency or National Council on Compensation Insurance (NCCI). The main purpose of a collection strategy is to assist the collector in managing an account through the escalation cycle (collection procedures). The assignment functions provide an on-line ability to: add or delete collectors or managers to the system; establish or change work flow parameters such as collector or experience level and management authorization to move or prioritize accounts; and change cross-platform parameters such as dollar amount limit for special program accounts which reside at the local area network (LAN) level but will interface to the mainframe level.

The manage collector queues processing function 17 provides an on-line ability to: move one group of collection accounts from one collectors queue to another's collector's queue; and prioritize an account for immediate attention by a collector or manager.

The work flow processing function 18 (detailed by the process chart of FIGS. 2–17) provides the functionality needed by managers, collectors, previewers, analysts, and experts to manage collection accounts. The workflow processing function 18 includes a collector processing function 19, a manager processing function 110, and a miscellaneous processing function 111.

The collector processing function 19 provides: inquiry capability for accounts which are assigned to them; the ability to look ahead to a given day and see, by category, how many items are diaried for activity; the capability to receive prompts generated by the system indicating the next activity to be taken in escalation; the ability for the collector to amend the collection strategy for one of their accounts within certain parameters; the capability to follow any scripting which the collection strategy deems necessary to expedite the account; the ability to update information on the data base such as financial status, type of dispute, and any free form documentation in the activity log such as debtor responses; generation of collection letters and documents to be printed on the LAN or sent via electronic mail to a manager, previewer, or another collector; the ability to create spread sheets for breakdowns, promissory notes or payment plans; the ability to refer accounts to collection agencies and attorneys and NCCI via tape feed or electronic transmission and have the applicable documents automatically created, the ability to refer accounts, including collector notes, to a manager; and access to mainframe based billing systems such as PACER (agency billings) and TABS (insured billings).

The manager processing function 110 includes all the processing functions available to collectors as well as: the ability to review a document referred by a collector for approval and send the document back to the collector with a response which includes authorization of disbursements; the ability to override a collection strategy for an account the collector believes should not be processed in accord with the prescribed course of action; access to management operating statistics (MOS) information generated daily on the status of collectors in an on-line environment; the ability to add, update, or delete scripting; the ability to update various data tables such as collection agency lists, region office contact lists, and attorney tables.

The miscellaneous processing function 111 provides for previewers having: the ability to update missing information for an account the ability to receive referrals from collectors or managers in their own queue; and inquiry capability. The miscellaneous functionality also entails analysts having the ability to query the data base and download data into a spreadsheet or report and inquiry capability.

Figure 2:
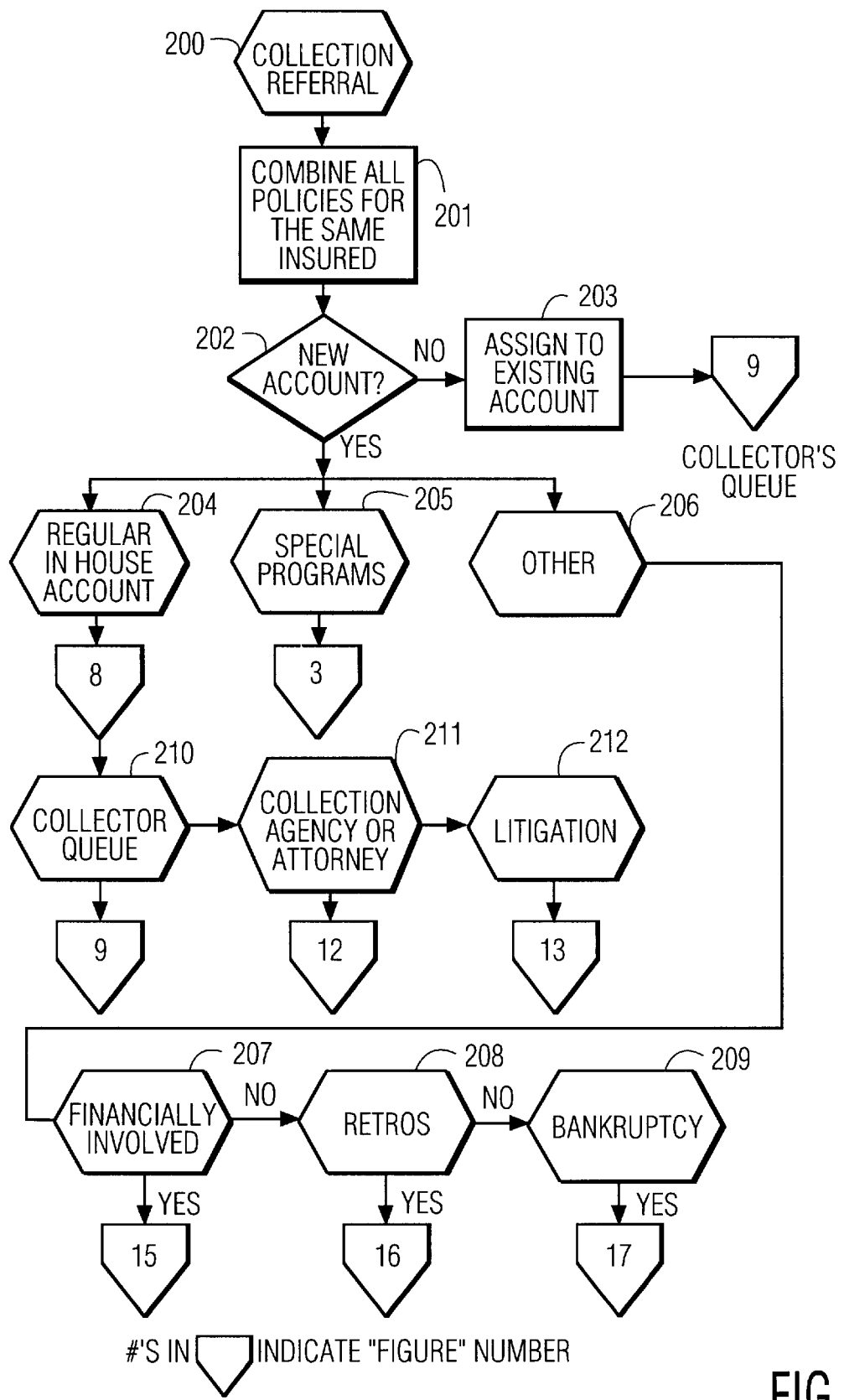

An overview of the workflow process for managing insurance premium collection accounts is depicted by the schematic flow chart in FIG. 2. The collection process begins with the system receiving a collection referral 200. A collection referral is an unpaid account submitted to the collector for obtaining a payment on the unpaid account. Typically in a large organization the billing activities are processed by one department or staff of personnel and the collection of delinquent accounts are processed by a separate department or staff of people. Unlike the activities of a billing department, the collection of accounts typically requires personal contact with the debtor and may involve judgement decisions as to referring the account over to a collection agency or litigation attorney. The system automatically combines all policies for the same insured 201 and determines if the collection referral is a new account 202. If the collection referral 200 is not a new account then the process assigns the collection referral 200 to an existing account 203 which is then subjected to a predefined process called a collector's queue (see discussion of FIG. 9). If the collection referral is a new account then the process determines if the collection referral is to be processed as a regular in-house account 204, special program 205, or other program 206 such as a financially involved agent 207, retro 208, or a debtor who is in bankruptcy status 209. If the collection referral is a new, regular in-house account then the process directs the collection referral to either a collector's queue processing 210, collection agency processing 211 or litigation processing 212. If the account is of another type, i.e. a financially involved agent 207, retro 208 or debtor who is in bankruptcy status 209 further processing for that type of account is respectively performed.

Figure 3:
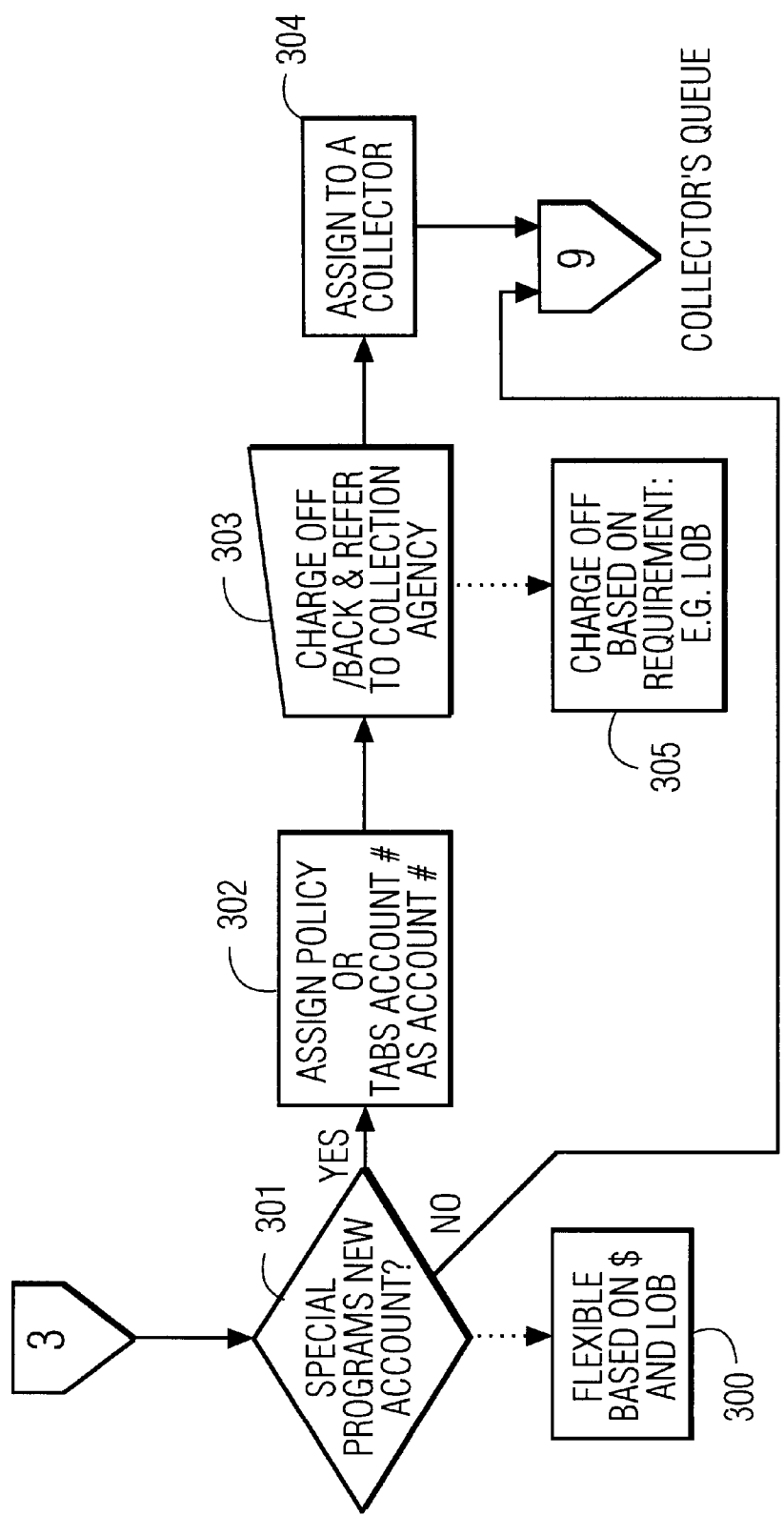
Figure 4:
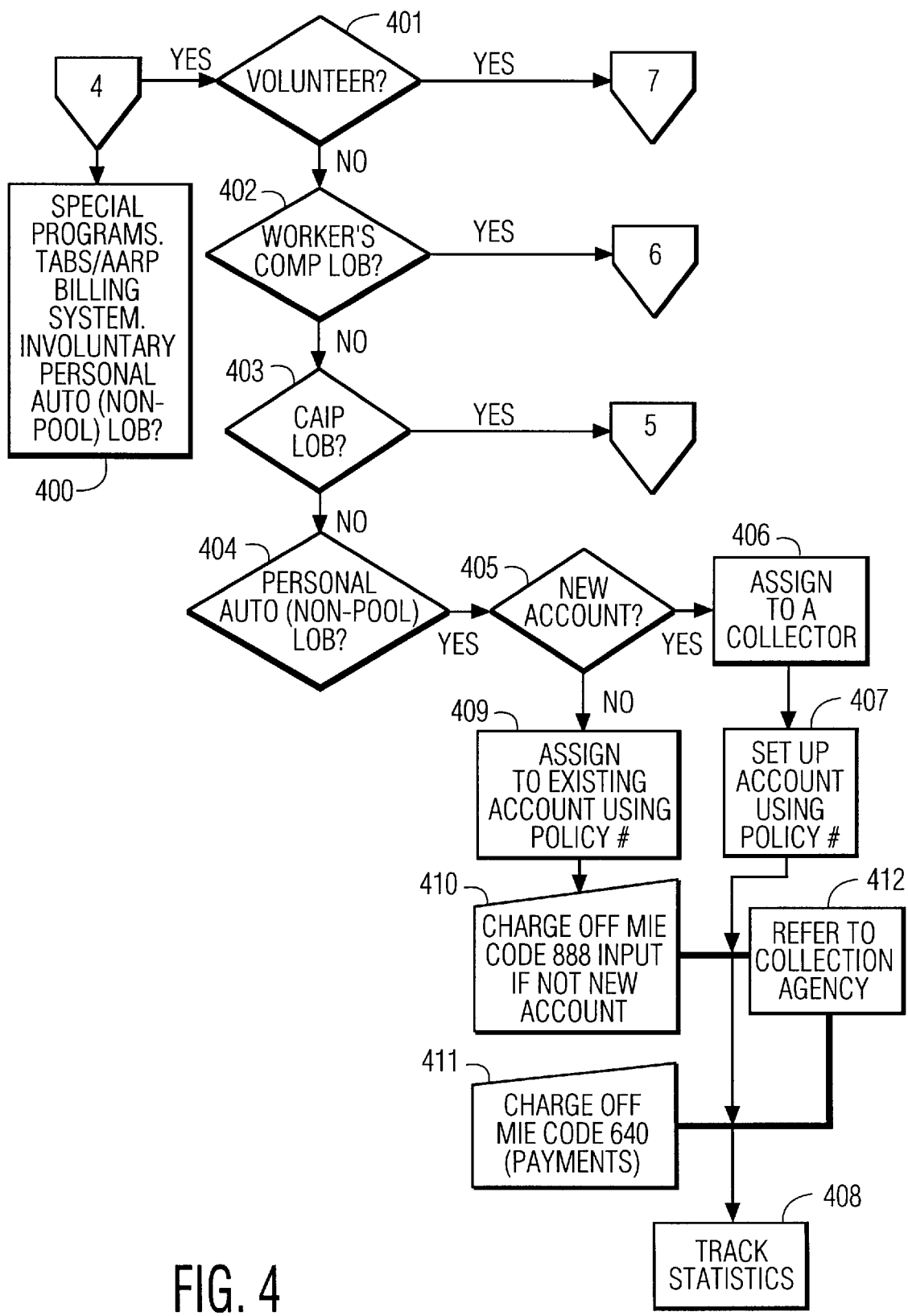
Figure 5:
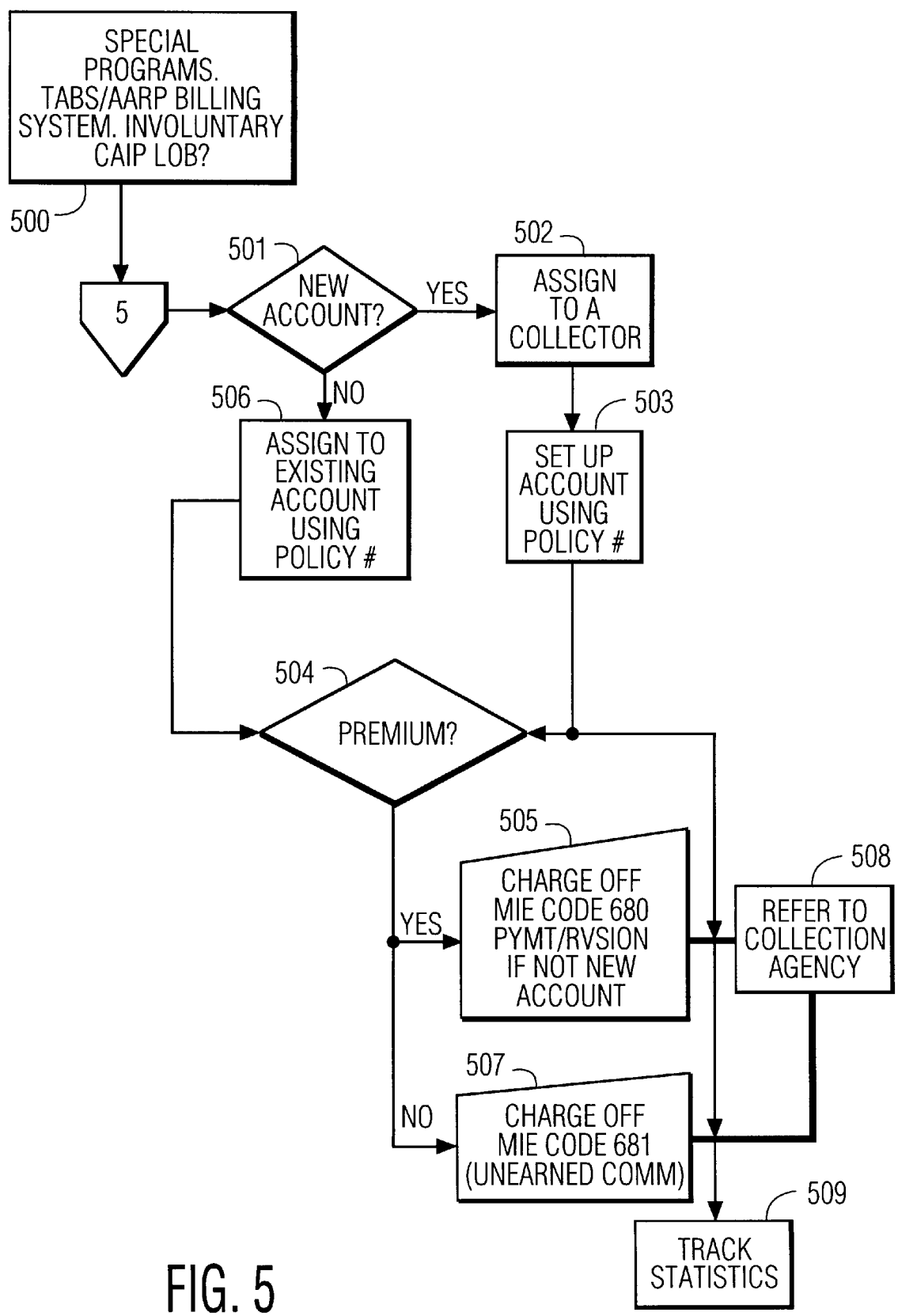
Figure 6:
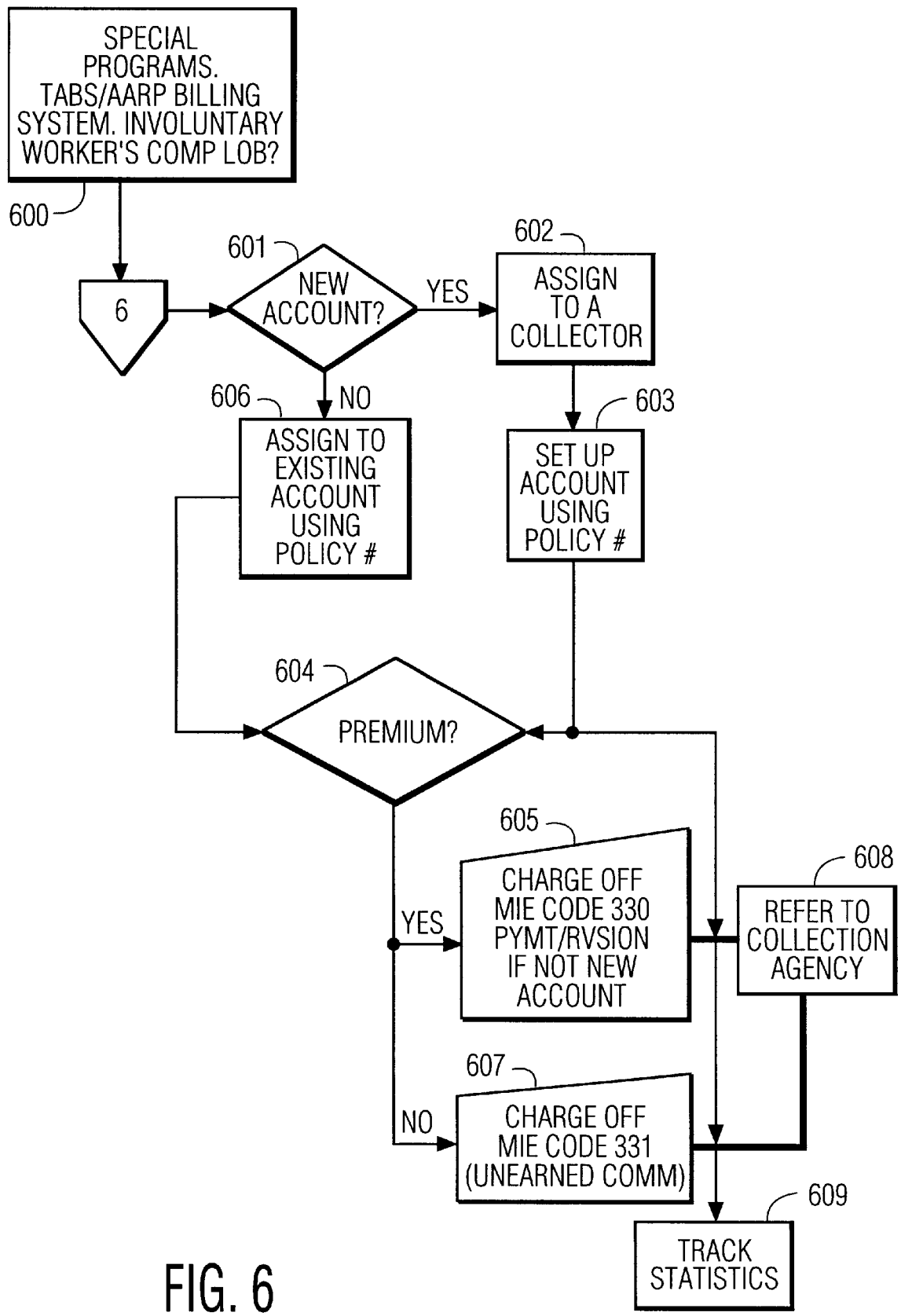
Figure 7:
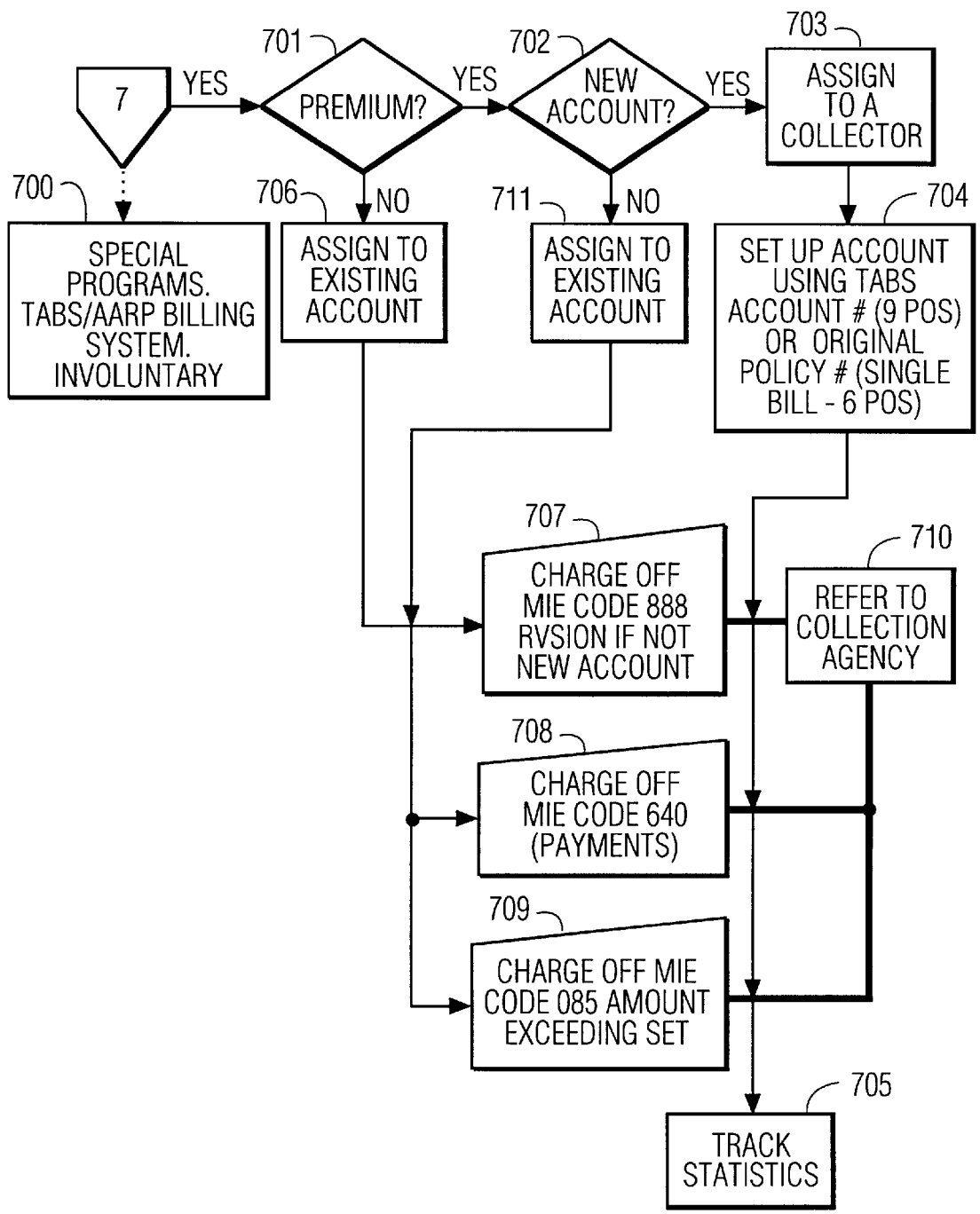

The workflow process schematic depicted by FIGS. 3 through 7 addresses collection referral cases categorized as special program accounts that are new (see FIG. 3); that are TABS/AARP billing system generated either as personal auto, non pool coverage, FIG. 4, CAIP LOB (line of business), FIG. 5, workers compensation LOB, FIG. 6, and voluntary cases, FIG. 7. Among the different collection referral case types considered by the present invention are, TABS which refers to a system for direct billings to an insured, PACER which refers to a system for billing agents who in turn bill an insured and are responsible for collection from the insured, CAIP which refers to commercial auto insurance pool, and workers compensation LOB which refers to insurance for workers injured in the course of employment.

Referring now to FIG. 3 there is shown a schematic flow chart of the process for new accounts categorized as special program accounts. Determination of this status is based on flexible criteria such as dollar amounts involved and LOB (line of business) 300. Once the workflow process has automatically determined that the collection referral is a new account under a special program 301, a policy (TABS) 302 account number is assigned as the processing account number. A keyboard input 303 is required indicating whether this collection referral is to be treated as a charge off (considered a loss and no longer processed for collection) or is to be processed for referral to a collection agency. The decision as to charge off status 305 is based in part on dollar amounts involved and LOB. In other words, if the debt is a small enough amount then it may be more efficient to simply accept the loss and not further expend processor resources. After the keyboard input 303 the collection referral is assigned to a collector 304 for further processing. Or, if the account is not categorized under a special program account the account is queued for further processing. In this segment of the schematic flow chart, the workflow process in conjunction with the computer system automates the repetitive, routine task of directing a new account under a special program for assignment to a collector but provides for manual intervention to eliminate the collection referral from further processing if it meets predetermined charge off criteria.

Referring now to FIG. 4 there is shown a schematic flow chart of the workflow process for an account subject to a TABS or AARP billing system as an involuntary, personal auto (non-pool) LOB 400. The process determines if the collection referral status is voluntary coverage 401, worker's compensation LOB 402, CAIP LOB 403, or personal auto (non-pool) LOB 404 for further respective processing. If personal auto (non-pool) LOB coverage and the process determines it is a new account 405 then the collection referral is automatically assigned a collector 406, set up with an account number using the policy number 407 and the process automatically tracks the statistics 408 on resolution of similar type cases. If the process determines that the personal auto (non-pool) LOB coverage is not a new account, then the collection referral is automatically assigned to an existing account using the policy number 409. The process then awaits a key board input 410 for a charge off MIE code 888 and simultaneously process the account for referral to a collection agency 412 with simultaneous key board input 411 capability for a charge off code of 640 if during the interim payments are received. An MIE code is a classification of expenses for accounting purposes. This segment of the workflow process automates the repetitive, routine task of determining the policy type of the collection referral, determining whether the collection referral is a new account and should be assigned to a collector and set up with the policy number as the account number, or if the collection referral is not a new account and the process manual input of an appropriate charge off code with a simultaneous referral to a collection agency.

Referring now to FIG. 5 there is shown a schematic flow chart of the workflow process for a policy categorized as a special program, TABS/AARP billing system, involuntary, CAIP LOB 500. Upon determination that the collection referral is a new account 501 under this category, a collector 502 is assigned with the policy number as the account number 503, and simultaneous tracking of this information for statistical purposes 509. Upon a determination that the collection referral under this category is not a new account 501, the collection referral is assigned to an existing account using the policy number 506. Whether or not the collection referral is a new account under this category 504, the process requires manual keyboard inputs 505 or 507 for appropriate charge off codes with simultaneous processing for referral to a collection agency 508. This segment of the workflow process automates routine, repetitive tasks of assigning account numbers and collectors, while providing for manual charge off inputs with simultaneous referral to a collection agency. The system also automates generation of statistical data for these type of accounts for developing decisional criteria.

Referring now to FIG. 6 there is shown a schematic chart of the workflow process for a policy categorized under special programs, TABS/AARP billing system, involuntary, worker compensation LOB 600. Upon a determination that the collection referral is a new account 601 under this category, a collector 602 is assigned with the policy number as the account number 603 and the computer system tracking this information for statistical purposes 609. Upon a determination that the collection referral under this category is not a new account 601, the collection referral is assigned to an existing account using the policy number 606. Whether the collection referral is or is not a new account under this category, the process determines if premium recovery is sought 604 and awaits keyboard inputs 605 or 607 for appropriate charge off codes with simultaneous processing for referral to a collection agency 608. This segment of the workflow process automates the repetitive, routine tasks of account status determination, assignment of account numbers and providing for proper manual indication of charge off codes. The process also automates tracking of this data for statistical purposes.

Referring now to FIG. 7 there is shown a schematic flow chart of the workflow process for collection referrals categorized as special programs, TABS/AARP billing system, involuntary 700. Upon a determination that the collection referral under this category concerns premium recovery 701 and is a new account 702, a collector 703 is assigned with the billing number or original policy number 704 set up as the processing account number and the case is tracked for statistical purposes 705. Upon a determination that the collection referral does not concern premium recovery, the case is assigned to an existing account 706 with the system awaiting manual inputs of charge off codes 707, 708, or 709 and simultaneous referral of the collection case to a collection agency 710. Should the premium recovery involve a new account, the case is assigned to an existing account 711 and manual inputs of charge codes 707, 708, or 709 awaited. This segment of the workflow process automates the routine, repetitive task of assigning account numbers while allowing for manual input of charge off codes with simultaneous referral to a collection agency.

Figure 8:
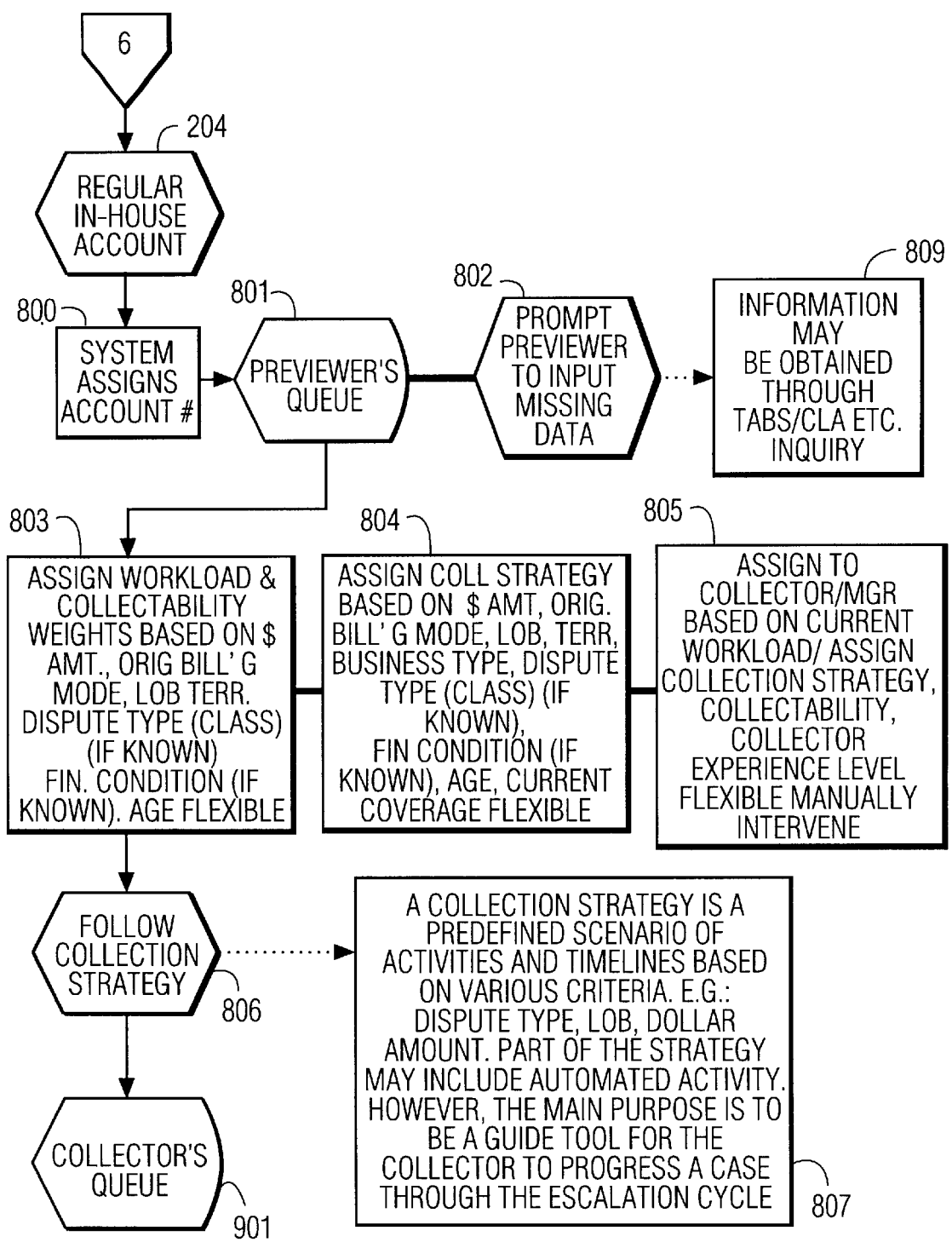

Referring now to FIG. 8 there is shown a schematic flow chart of the workflow process for regular in house accounts 204. The collection referral is assigned an account number 800 and a previewer's queue 801 with a simultaneous prompt for the previewer to input missing data 802 which may be obtained from the TABS billing system 809. The previewer's queue 801 is basically an electronic in-box through which all activities to date on the account are routed. Assigned to the collection referral are workloads and weights 803 based on criteria such as dollar amounts, original billing mode, LOB, territory involved, dispute type, financial condition and age of debtor and, the system simultaneously assigns a collection strategy 804 based on these same criteria, and simultaneously assigns the case to a collector or manager 805 based on current workload, collection strategy determined, collectability of the case and collector experience level with the capability for manual intervention by appropriate collection's staff. The collection strategy 806, 807 is followed through to the collector's queue 901 (in accord with FIG. 9) which is basically an electronic in box of all account activities, manager and expert referrals, and expired diaried activities performed on the account including automated and requested letters, phone calls, and referrals. This segment of the workflow process automatically generates a collection strategy as a predefined scenario of activities and time lines based on various criteria, including but not limited to, dispute type, LOB, dollar amount 807. Part of the strategy may include automated activity, however, the main purpose is to be a guide tool for the collector to progress a case through the collection steps.

Figure 9:
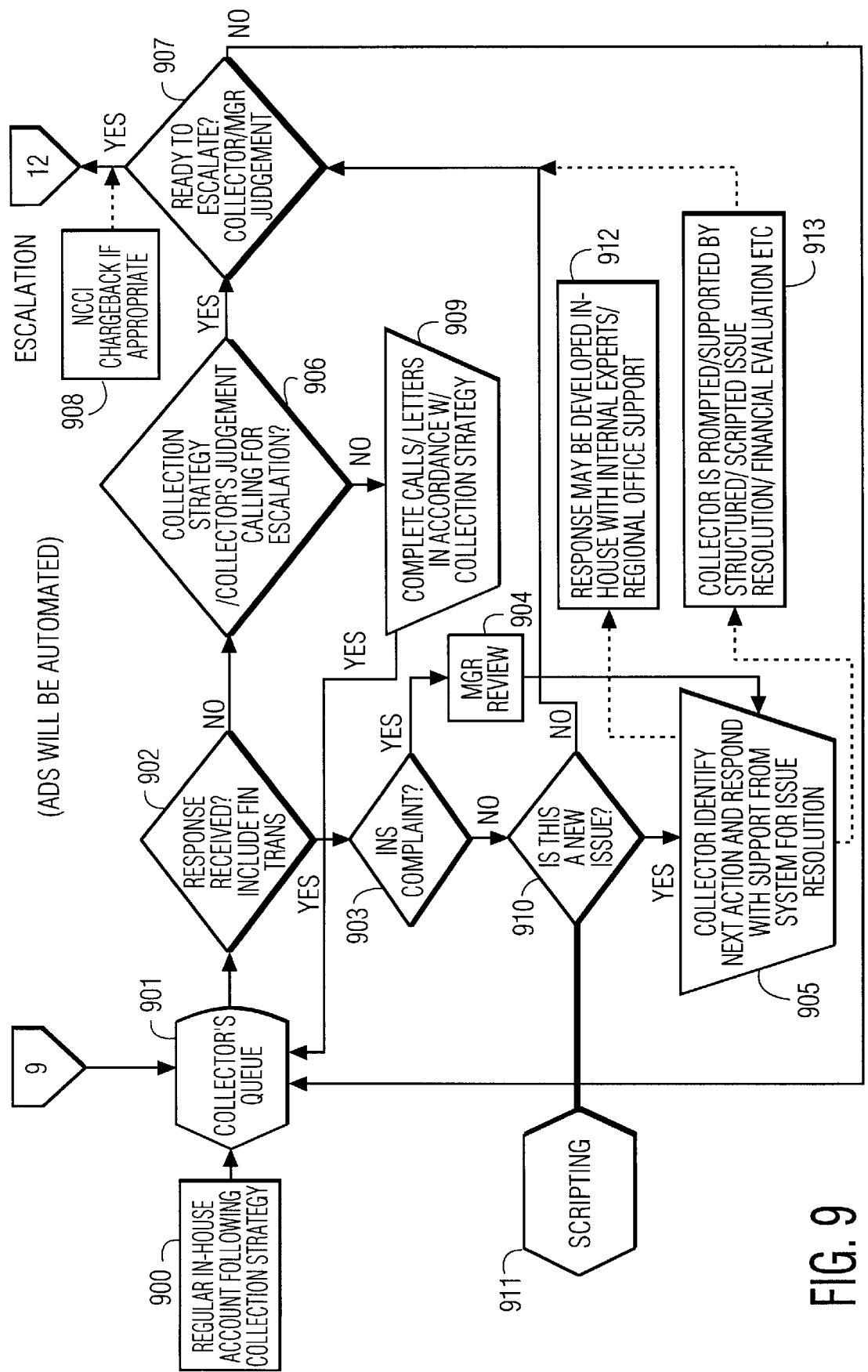

Referring now to FIG. 9 there is shown a schematic flow chart of the process from the collector's queue 901 which the system displays following generation of a collection strategy for a regular in-house account 900. The collector's queue 901 is an electronic inbox through which expired diaries, account activities, and manager and expert referrals, etc. are routed. For a response 902 received from the debtor indicating that the insured or debtor has a complaint 903, the process undertakes steps for a manager's review 904 and requires the collector to manually identify the next action and respond with support from the system for issue resolution 905. The collector may be prompted by structured or scripted issue resolution by the system 913. Among the forms the issue resolution 905 may take are a letter to the debtor addressing the complaint or a referral to a collection agency. Where no response is received 902 and escalation of the case 906 is called for in the collector's or manager's judgement 907, the case is processed in accord with FIG. 12 and an NCCI charge back is made if appropriate 908. Alternatively, in the collector's or manager's judgement 907, the case may be requeued to collector's queue 901. Otherwise, if escalation is not called for 906 then calls or letters in accord with the developed collection strategy are completed 909 with the case processed through the collector's queue 901. Upon a process determination that the insured does not have a complaint 903 and the case presents a new issue 910, the system undertakes a simultaneous scripting process 911 for the benefit of the collector requiring to manual identification of the next action and response with support from the system for issue resolution 905. Scripting by the system involves creating a series of questions which a collector would be prompted to ask a debtor in reference to a particular issue or dispute. The collector has the ability to input replies or answers to the questions and store them for future access. The scripting process and replies by the collector reside in the word processing facility in the workstation for inclusion in letters, documents, memos, etc. Upon a determination that the complaint does not present a new issue 910, the system determines, using collector or management judgement, whether the case is ready for escalation to a collection agency or litigation 907 or reprocessing from the collector's queue 901. In summary, the workflow process at this stage automates generation of letters to the debtor, scripted dispute handling, and determination whether the case is referable to a collection agency or outside counsel.

Figure 10:
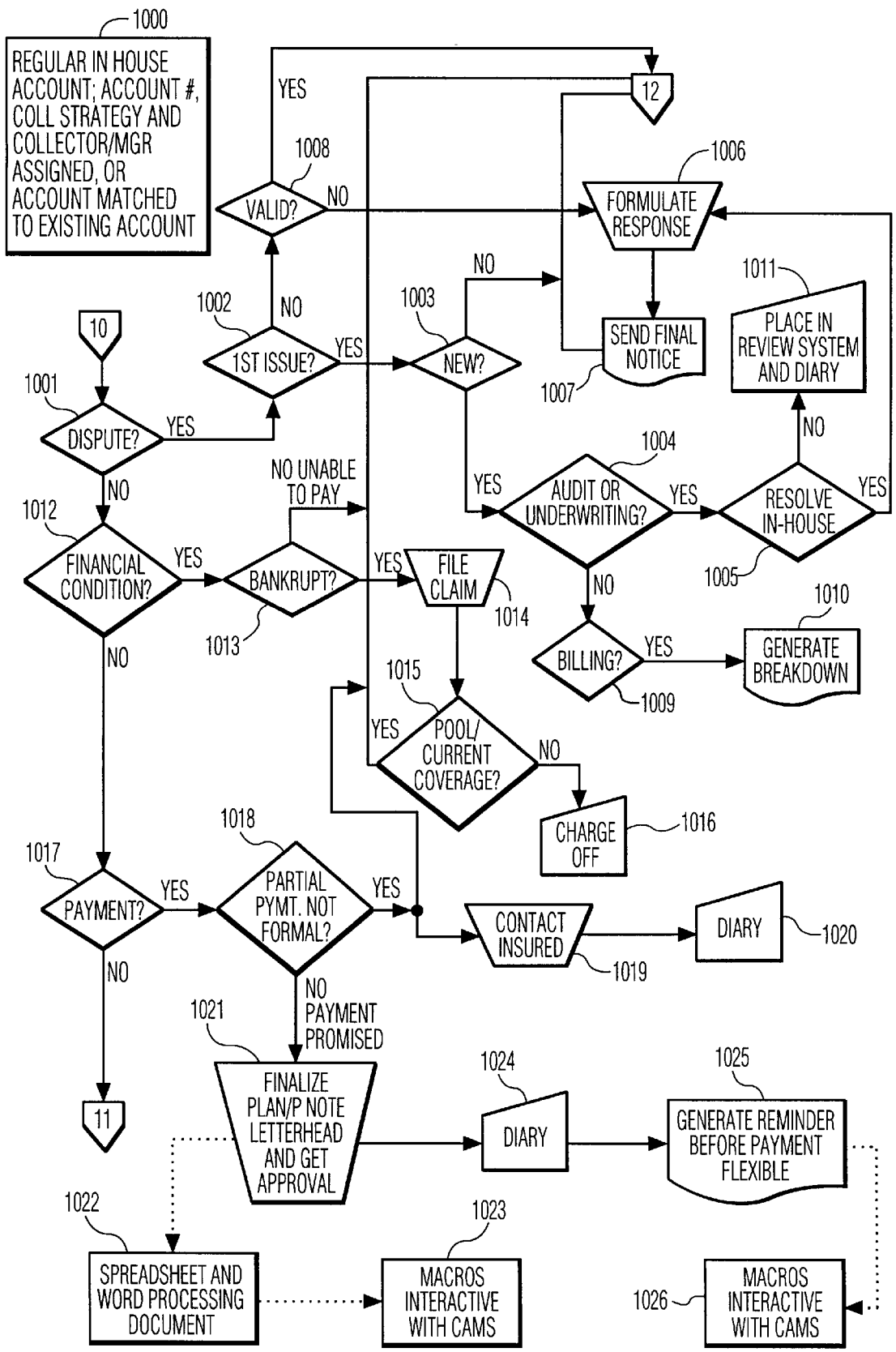
Figure 11:
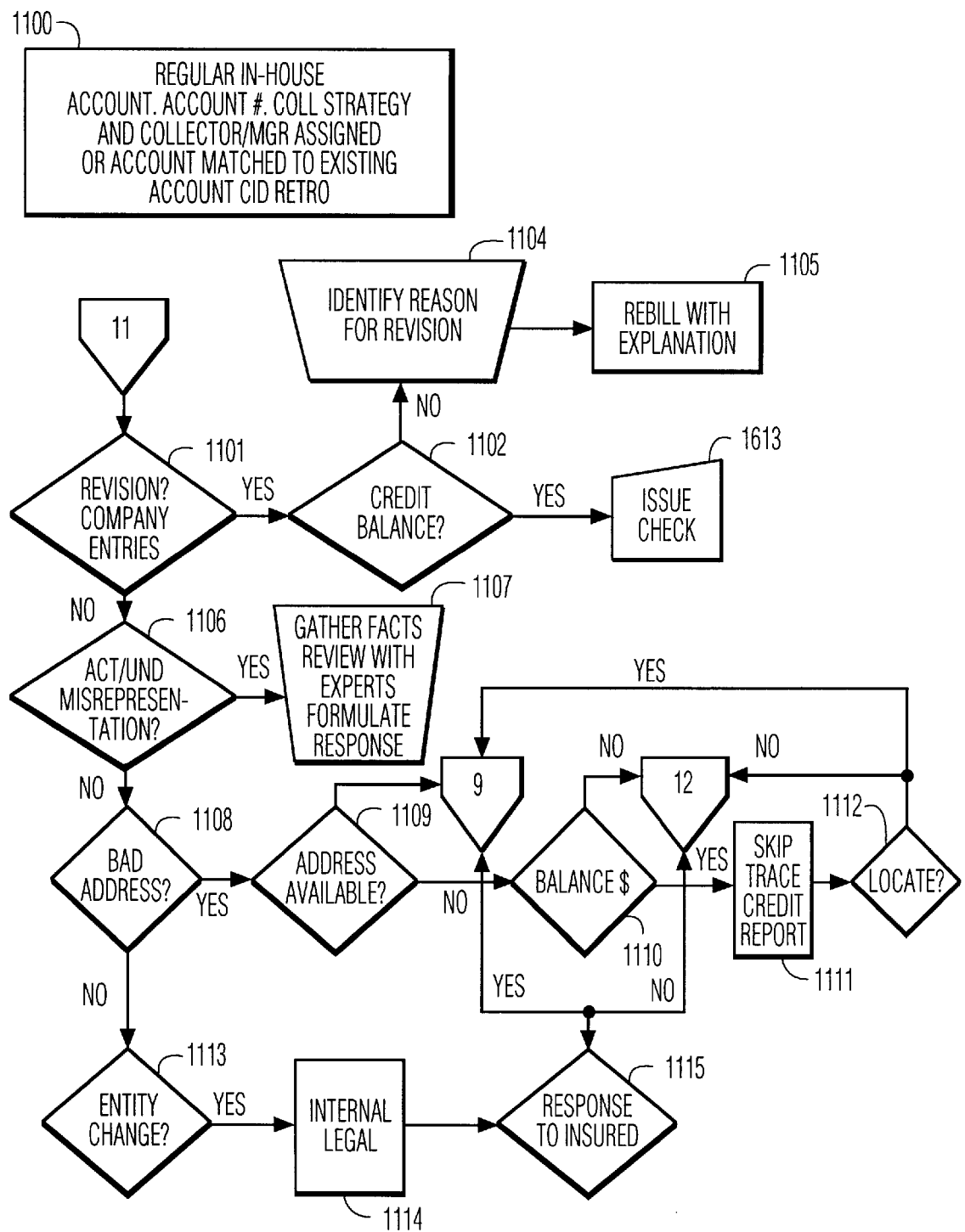

Referring now to FIG. 10 there is shown a schematic flow chart of the workflow process for a CID retro collection referral where a response has been received from the debtor or insured. CID meaning commercial insurance division which designates a specific type of account requiring specific processing. Upon a determination that the CID retro concerns a dispute 1001 that is a 1st issue 1002, new 1003, has auditing or underwriting implications 1004, and is to be resolved in-house 1005, the collector is tasked to formulate a response 1006 to the insured, a final notice document 1007 to the insured is generated and, the case is progressed for assignment to a collection agency or attorney in accord with the process depicted in FIG. 12. Otherwise the case is processed for review and diaried 1011. When the 1st issue 1002 potential is invalid 1008, the collector is tasked to formulate a response 1006 and the case is processed from block 1007. Should the 1st issue 1002 not be new 1003 the case is processed in accord with FIG. 12. If audit or underwriting matters are involved 1004 which can be resolved in-house, the collector is tasked to formulate a response 1006 as discussed above, otherwise, if billing matters 1009 are involved a breakdown document of the bill 1010 is generated. If no dispute is involved 1001, and should the insured be in a financial condition 1012 so as to inhibit payment of the debt, but not be in bankruptcy 1013, the case is processed in accord with FIG. 12. However, if the debtor is in bankruptcy 1013, a claim 1014 for the debt is filed with the bankruptcy court, and if the case involves pool insurance coverage the case is processed for referral to a collection agency or attorney in accord with FIG. 12. If pool insurance coverage is not involved 1015 a charge off 1016 is indicated by the collector. When a debtor is not in a financial position to inhibit payment of debt 1012 and the insured makes a promise for payment 1017 in a partial manner 1018, the insured is contacted 1019 by the collector with the contact entered into the diary 1020 and, the case is processed in accord with FIG. 12. A diary is a log kept by the system for documenting all diaried activities performed on the account including automated and requested letters, phone calls, referrals, etc. When the insured promises to make payment 1017, 1018, the collector finalizes an approved payment plan with a promissory note by way of a letter to the insured 1021. The payment plan is entered into the diary 1024 and a reminder before payment is due 1025 is generated. The collector is provided with spreadsheet and word processing documents 1022 in conjunction with macros 1023 for providing the finalized payment plan and macros 1026 for generating the reminder before final payment. Macros, being small programs within a program for automating keystroke tasks, can be utilized for generating form documents. In this portion of the workflow process, the collector is guided by the process with selective automation for resolving collection referral issues concerning disputes 1001, financial condition 1012, and payment plans 1018, 1021.

Figure 11:
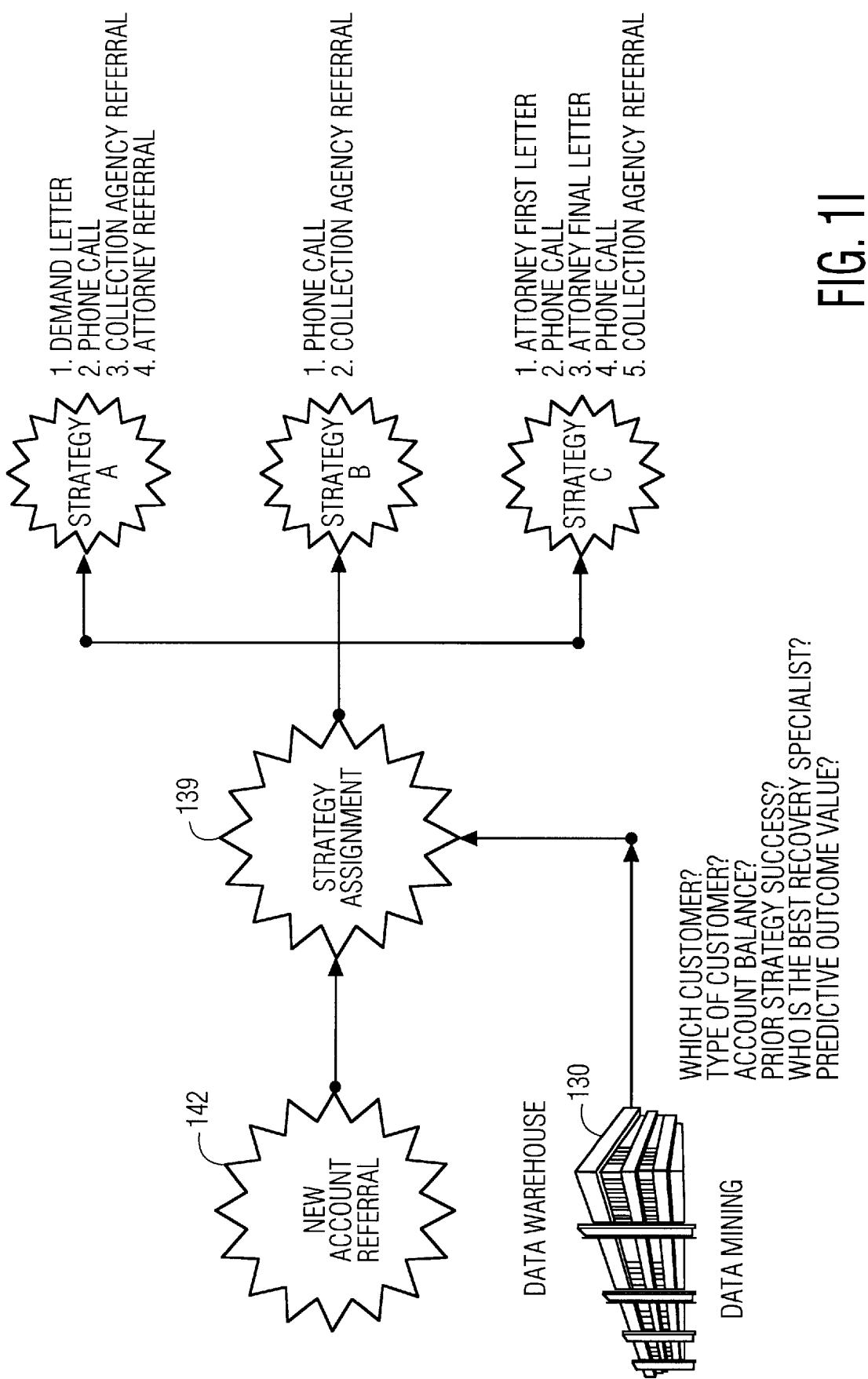
FIGS. 2–17 are a schematic flow chart depicting the workflow process methodology of the present invention computerized system.

Referring now to FIG. 11 there is shown a schematic flow chart of the process concerning a CID retro 1100 where the insured has not agreed to any payment 1017. When revisions concerning collection 1101 have been entered into the system and a credit balance 1102 in favor of the insured remains, the collector is prompted to issue a check payment 1103 to the insured. Otherwise, a manual identification of the reason for the revision 1104 and the insured is rebilled with an explanation 1105. When a case concerns an agent or underwriter misrepresentation 1106, the collector is required to manually gather facts for review with experts to formulate a response 1107. If the address for the debtor is improper 1108 and a correct address is available 1109, the case is process from the collector's queue in accord with FIG. 9. If no address is available and a balance is still due 1110, a skip trace is performed to locate the debtor and a credit report is issued 1111. Should the debtor be located pursuant to the skip trace 1112, the case is processed from the collector's queue in accord with FIG. 9, otherwise, the case is processed for assignment to a collection agency or an attorney in accord with FIG. 12. If the case concerns an entity change 1113 (i.e. corporate transfers of assets), the case is processed through the internal legal department 1114. Lastly, If the internal legal department mandates a response to the insured 1115, the case is processed in accord with FIG. 9, otherwise, the case is processed for assignment to a collection agency or attorney in accord with FIG. 12. In summary, this portion of the workflow process exhausts in-house collection efforts before referring the case to an outside collection agency or attorney for litigation and automates attorney review prompts 114.

Figure 12:
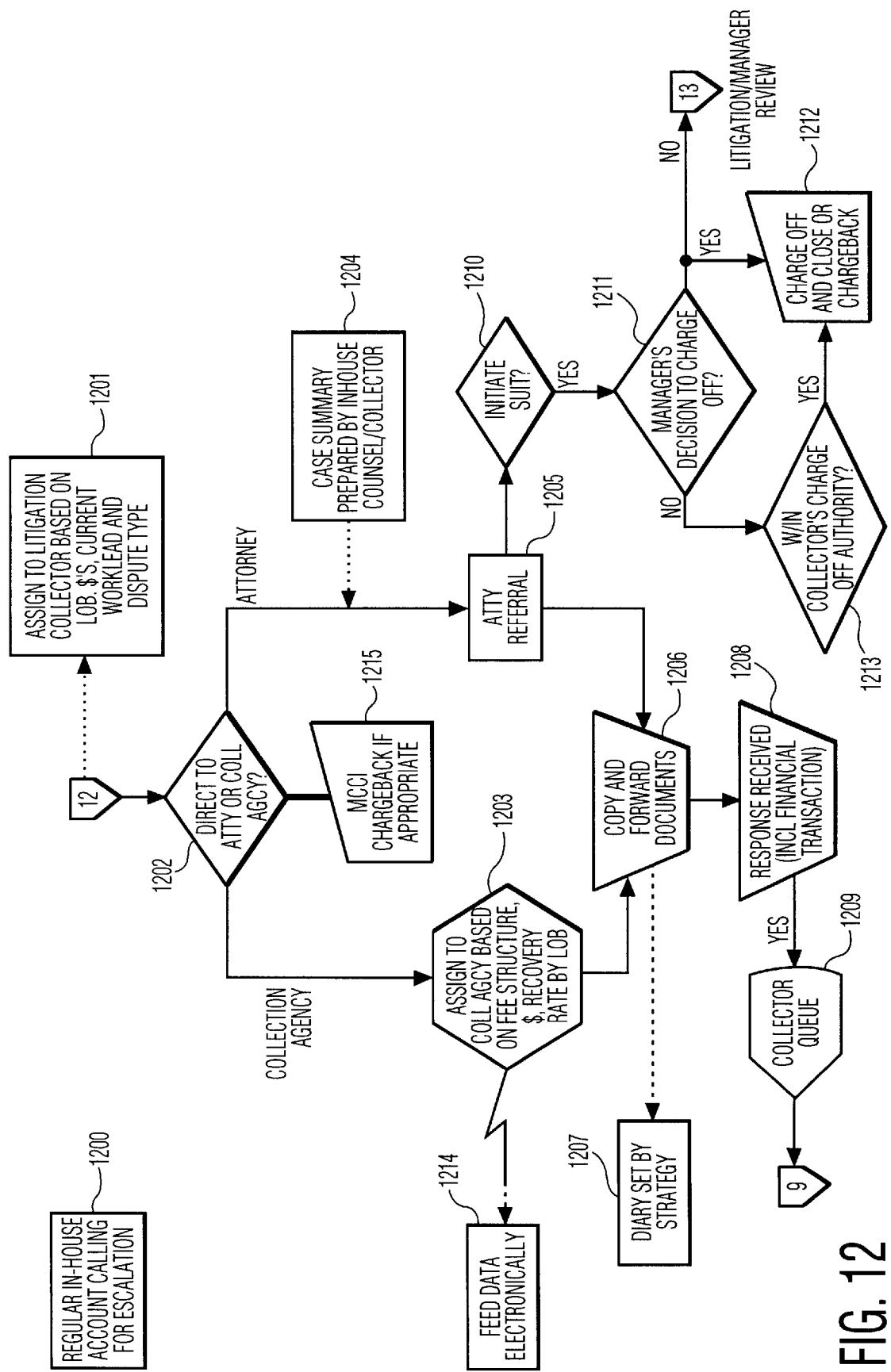

Referring now to FIG. 12 there is shown a schematic flow chart of the workflow process for escalating a collection referral case 1200 for assignment to a collection agency or attorney. The determination is automated and is based in part on LOB, dollar amounts, current workload and dispute type 1201. The process permits a simultaneous NCCI charge back if appropriate 1215. NCCI refers to a particular type of account requiring specific processing. The process directs 1202 a case 1202 to a collection agency 1203 based on fee structure, dollar amount, and recovery rate by LOB, with pertinent data fed to the collection agency electronically by facsimile or fax/modem 1214. Upon assignment of the case to the collection agency, documents pertinent to resolution of the case are copied and forwarded 1206 to the collection agency, the diary (activity log) 1207 is set by the collection agency referral strategy. The case is assigned to the collector's queue 1209 in accord with FIG. 9 if a response is received 1208 from the debtor. Should the case not be directed 1202 to a collection agency, a case summary is prepared by the collector or an in-house counsel 1204 and the case is referred to an attorney 1205 for determination if suit should be initiated 1210. The case summary along with other data pertinent to the case can be electronic mailed to the local counsel 1205. If suit is not to be initiated and, the collector has charge off authority 1213 without a manager's approval to charge off 1211, the collector can charge off and close the case 1212, otherwise, the case is processed for litigation in accord with the schematic of FIG. 13. If the decision to charge off is the manger's alone 1211, the manager can input to the system a charge off 1212. In summary, this portion of the workflow process, among other functions, automates facsimile generation 1204, electronic mail transmission of predetermined collection related data to local counsel 1204, and evaluation of next step to be undertaken 1202, 1210, and 1211.

Figure 13:
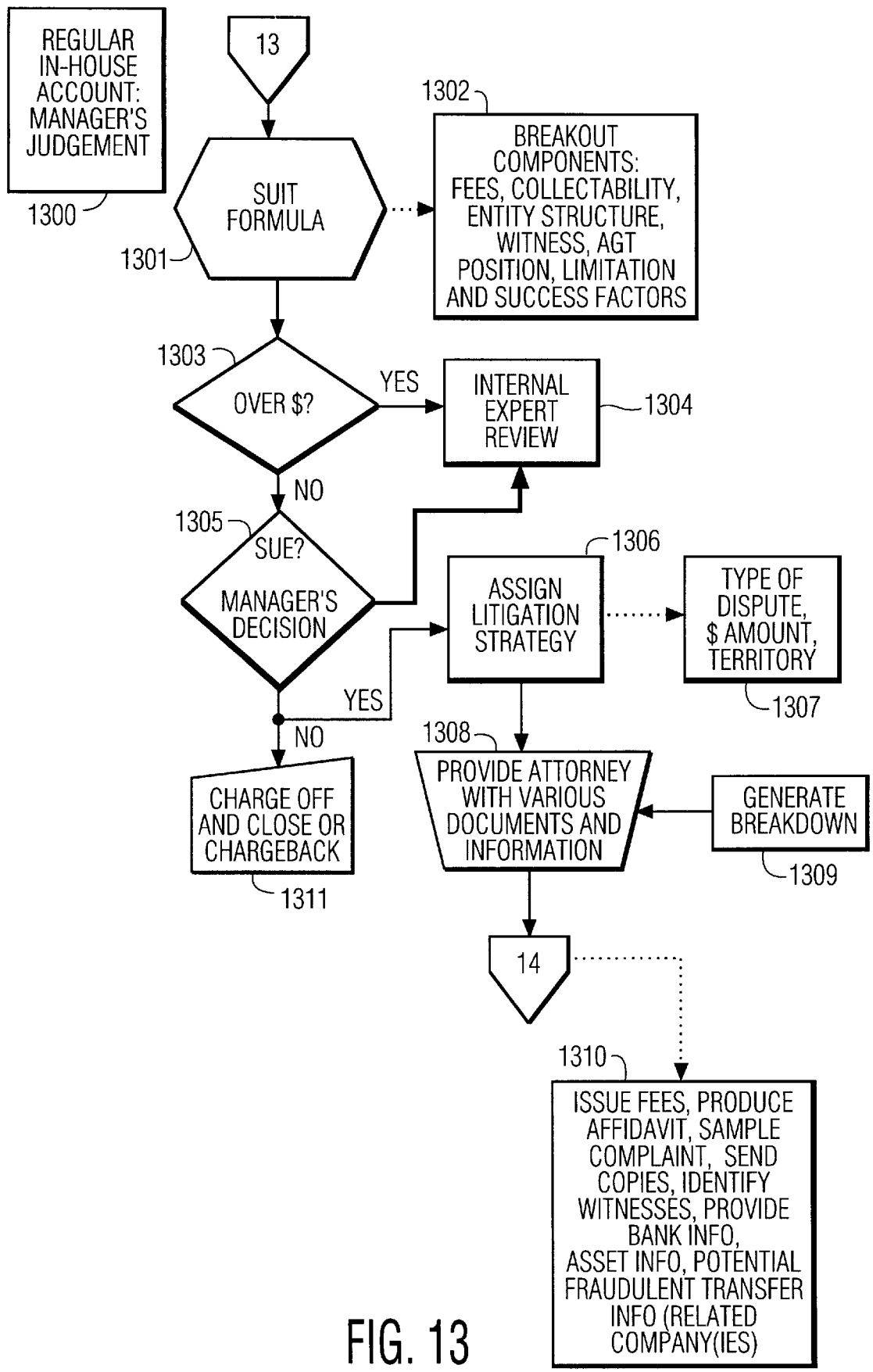

Referring now to FIG. 13 there is shown a schematic flow chart for processing a case for litigation which is undertaken with the manager's judgement 1300. Initially a suit formula 1301 is generated with a breakout of fees, collectability based on prior cases contained in the data base, entity structure (sole proprietor, partnership, corporation, holding company, etc.), witness availability, agent position in the case and other limitation and success factors 1302. If the dollar amount of the case exceeds a predetermined threshold 1303, the case is automatically subjected to an internal expert review 1304 based on flexible criteria, either way a determination is made as to whether to sue for recovery of the case 1305 which is ultimately the manager's decision. Should the manager decide that the case not be processed for litigation, the case is charged off and closed 1311, otherwise, a litigation strategy 1306 is assigned, based on the type of dispute, dollar amount and territory 1307. Upon assignment of a litigation strategy, the attorney is provided with various documents and information pertaining to the case 1308. A breakdown is generated 1309 in accord with block 1302 and the case is processed for the filing of a complaint by an attorney in accord with FIG. 14. Among the information and documents provided by the system to the attorney 1310 are issue fees, affidavits, sample complaint, identity of witnesses, bank information, asset information, potential fraudulent transfers to related companies, etc. In summary, this portion of the workflow process, among other functions, automates on site attorney review 1304, litigation strategy development 1306, and generation of sample complaints and pleadings 1310.

Figure 14:
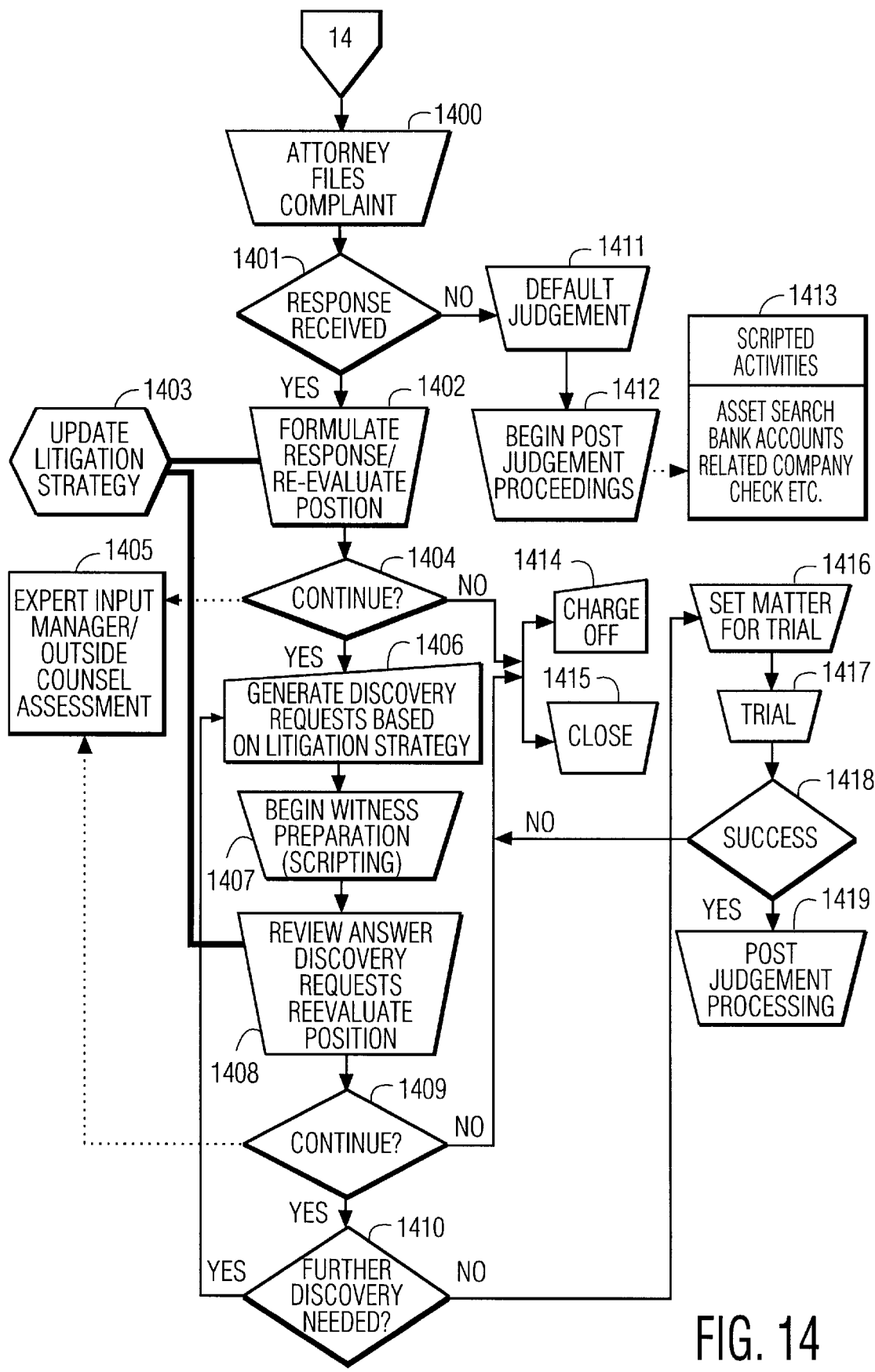

Referring now to FIG. 14 there is shown a schematic of the process for moving the case from the filing of a complaint by the attorney 1400. If a response to the complaint is not received 1401, default judgement 1411 and post judgement proceedings 1412 are undertaken against the debtor's assets, bank accounts, related company holdings, checks, etc. 1413, which are ascertained through scripted activities by the collector. Scripted activities are directed to the collector a series of questions developed by the system. If a response is received 1401 from the debtor, the collector or manager revaluates the position undertaken to commence suit 1402 and the litigation strategy 1403 is updated for the manager to consider. In conjunction with expert input, manager and outside assessment if the suit is continued 1404, the manager or collector inputs generated discovery requests based on the litigation strategy 1406 into the system. Witness preparation 1407 is undertaken via scripting means. The answer and discovery requests are reviewed 1408 with expert input in accord with block 1405. If the suit is not continued 1409, the case is manually charged off 1414 and closed 1415. If in conjunction with expert input 1405 the suit is continued 1409 and further discovery is needed 1410, the case is reprocessed from block 1406 for further discovery requests. If further discovery is not needed 1410, the case is manually set for trial 1416, trial is undertaken 1417 and, if successful 1418 post judgement processing is undertaken 1419, otherwise, the case is charged off 1414 and closed 1415. Among other functions, this part of the workflow process automates on site attorney review up to resolution of the case 1405 and, evaluates subsequent steps to be undertaken 1404, 1409 and 1418.

Figure 15:
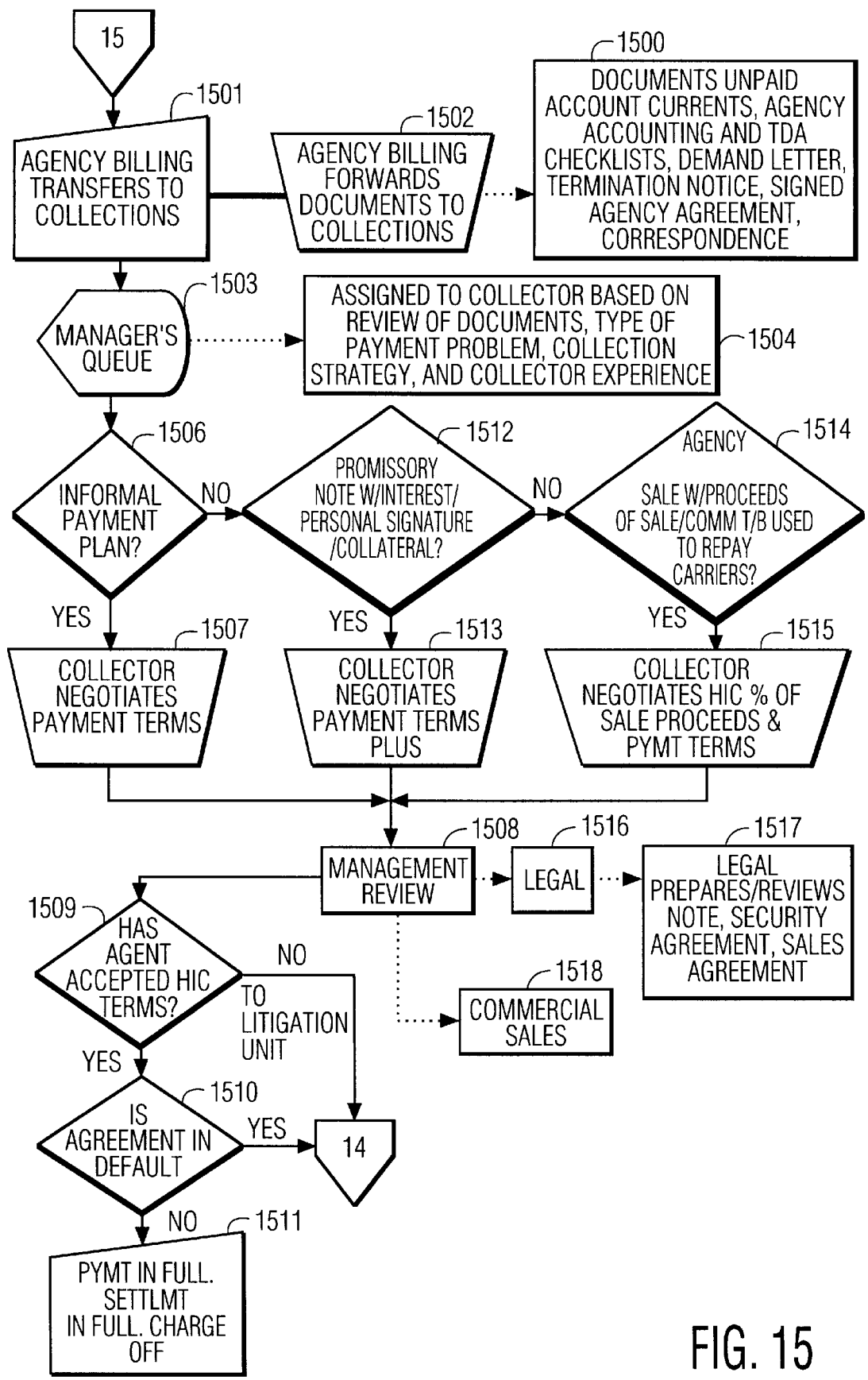

Referring now to FIG. 15 there is shown the schematic flow chart of the process for a collection referral concerning an agent's failure to satisfy the premium charges. The agency billing on the collection referral transfers the case to collections 1501 and forwards relevant documents to collections 1502 such as unpaid account listings, agency accounts, demand letters, termination notices, signed agency agreements and correspondence 1500. The case is progressed to a manager's queue 1503 which is an electronic in box indicating the collector assigned to the case based on review of documents, type of problem, collection strategy, and collector experience 1504. If an informal payment plan is viable 1506 the collector negotiates payment terms with the agent 1507, otherwise, if personal promissory note with interest, personal and collateral 1512 is available the collector negotiates these payment terms 1513. As a last alternative 1514 the agency is sold and the proceeds from the sale are used to repay the carriers with the collector negotiating the percentage proceeds and payment terms 1515. Each of the above payment plans is subjected by the system to management review 1508, including legal review 1516 and preparation of any promissory notes, security agreements, and sales agreements 1517 as well as commercial sales review 1518 if applicable. If the agent accepts the payment terms 1509 and defaults on the agreement 1510 the case is processed for litigation in accord with FIG. 14, otherwise, the case is indicated as paid in full, settled in full or charged off 1511. Among other functions, this sequence of the workflow process automates on site attorney monitoring till resolution of the case and evaluation of the next step to be undertaken 1509 and 1510.

Figure 16:
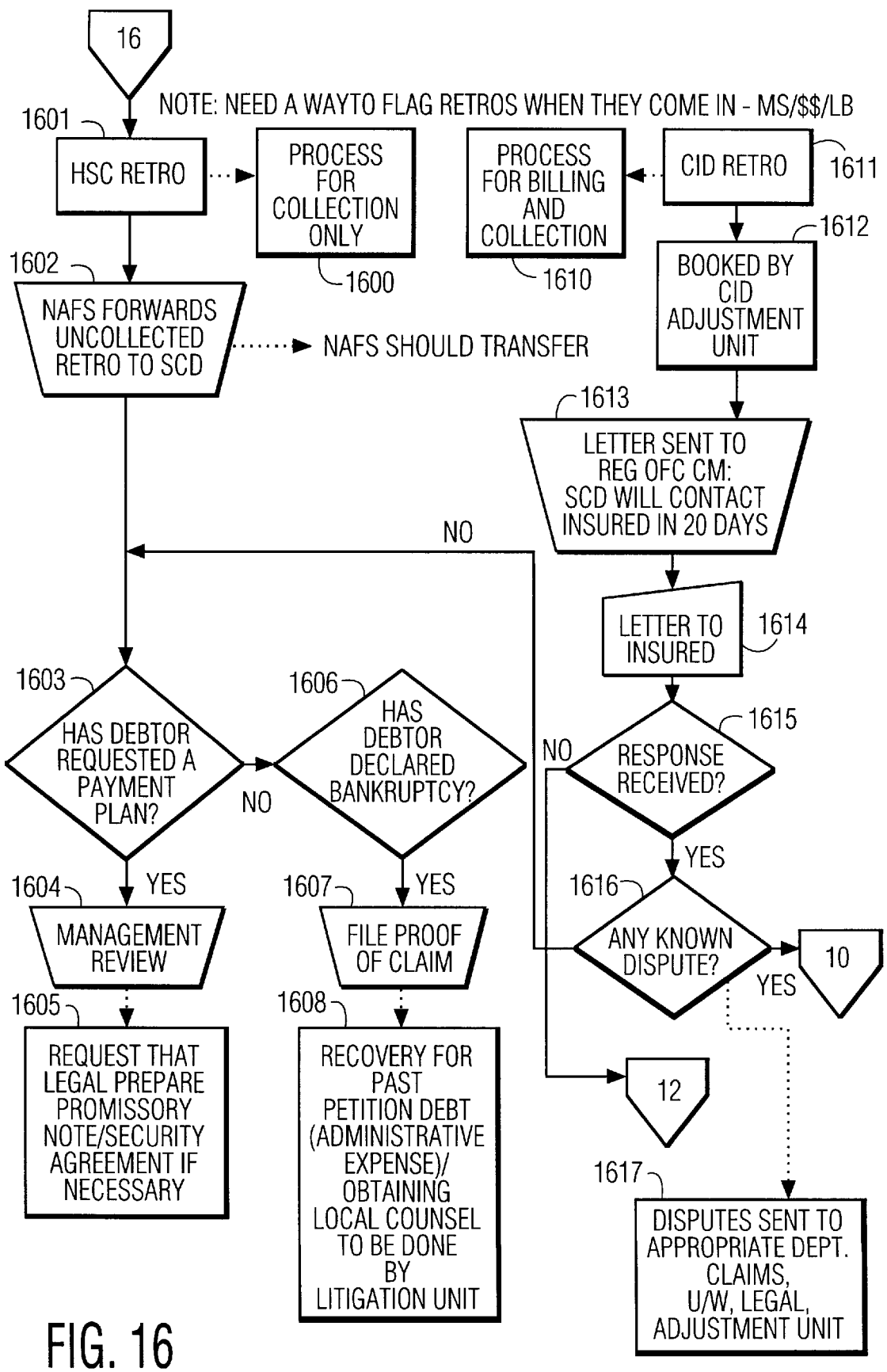

Referring now to FIG. 16, an HSC (Hartford Specialty Company) retro 1601 is processed for collection 1601 and is forwarded by NAFS (National Accounts Financial Services) to the system 1602 for collections processing only 1600. HSC and NAFS represent different account designations which require specific collection processing. If the debtor requests a payment plan 1603, management undertakes a review 1604 and the legal department prepares applicable promissory notes and security agreements 1605. Otherwise, if the debtor has declared bankruptcy 1606, proof of claims are filed 1607 with the bankruptcy court to secure position as a creditor with a goal of recovery for post petition debt 1608. Bankruptcy status and declared assets can be ascertained through the system LAN accessing federal bankruptcy databases, whose data are imported to the LAN database server discussed in conjunction with FIG. 1C.

For a processing a CID (Commercial Insurance Division) retro cases 1611 which is a process for billing and collection 1610, the case is transferred to the CID adjustment unit 1612. A letter is sent to the regular office indicating that collections will contact the insured in twenty days 1614. The letter to the insured 1613 is undertaken with aid of the system form letter library or macros. If a response 1615 is not received, the case is processed for assignment to a collection agency or attorney in accord with FIG. 12. If a response is received disputing the amount owed 1616, the case is processed in accord with FIG. 10 with disputes sent to an appropriate department such as claims, underwriting, legal and adjustment unit 1617 via electronic transfer methods. Among other functions, the workflow process for this portion automates access to a bankruptcy data base 1606.

Figure 17:
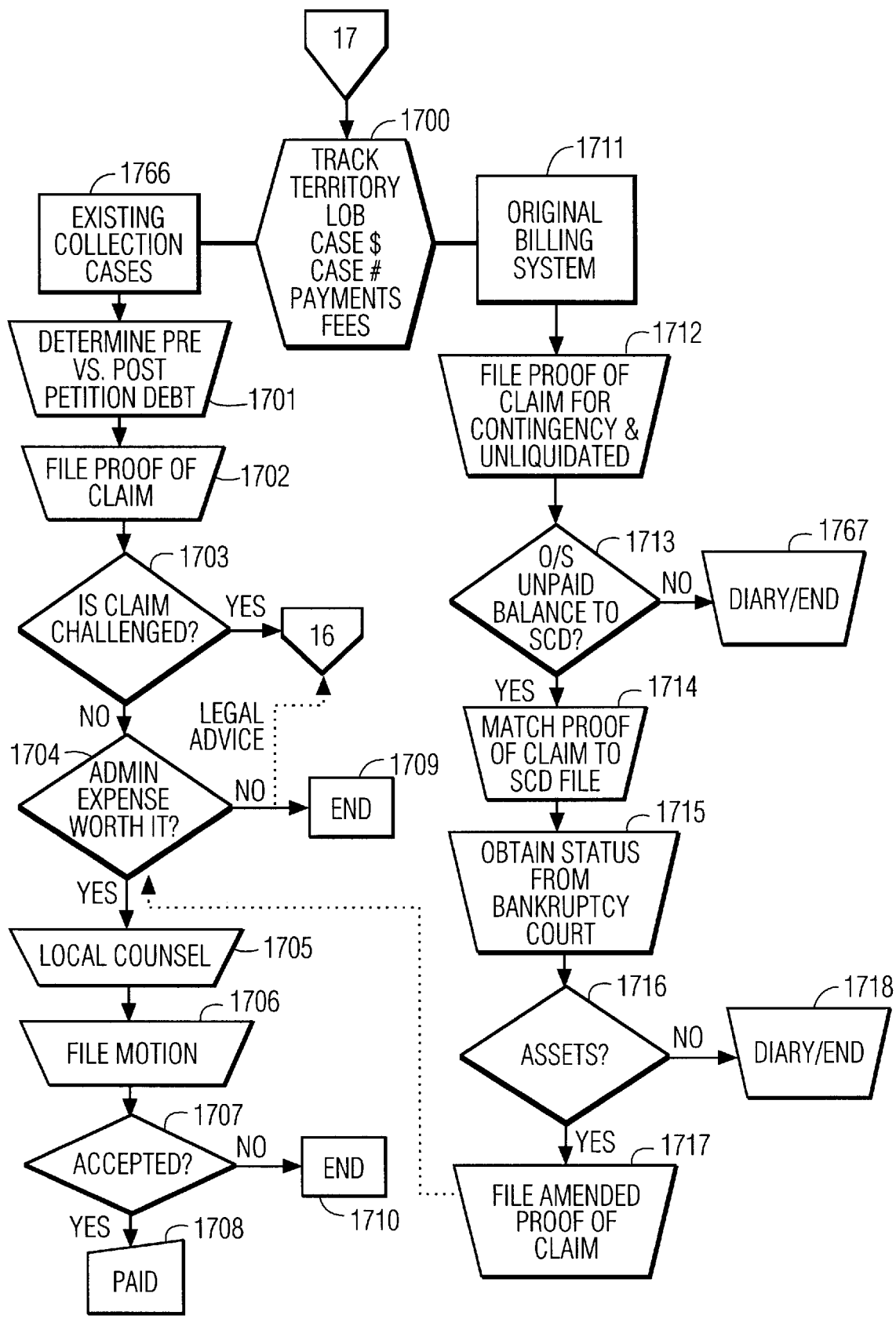

Referring now to FIG. 17 there is shown a schematic workflow chart of the system process for a case where the debtor is undertaking the filing of bankruptcy. For both existing collection cases 1766 and original billing cases 1711 the system undertakes a process of tracking territory, line of business (LOB), case dollars involved, case number, payments and fees to generate data for decisional purposes 1700. For existing collection cases, pre-petition debt versus post-petition debt is determined 1701, followed by the filing of a proof of a claim with the bankruptcy court 1702. If the claim is challenged 1703, the case is reprocessed as a retro in accord with FIG. 16 otherwise, a determination is made whether the administrative expense in pursuing recovery in bankruptcy court 1704 is justified, otherwise the case is closed 1709. If bankruptcy court should be pursued, local counsel is selected 1705 to file a motion with the court 1706. If the filed motion 1706 is accepted 1707, payment is noted into the system 1708, otherwise the case is ended 1710. For an original billing system generated case 1711 a filing of proof of claim for contingency or unliquidated damages is required 1712. If an unpaid balance is not due to the collections division 1713 the case is ended 1767, otherwise, the proof of the claim must be matched to the collections division file 1714, followed by obtaining a status of the case from bankruptcy court 1715. If there are no assets available to satisfy the claim 1716, the case is ended 1718, otherwise, an amended proof of claim 1717 is filed if justified in light of the administrative expense 1704. Among other functions, the workflow process described above automates referrals 1766, 1711, and evaluation of the next step to be undertaken 1703, 1707, 1713 and 1717.

It should be understood that the embodiment described herein is merely exemplary and that a person skilled in the art may make many variations and modifications to this embodiment utilizing functionally equivalent elements to those described herein. Any and all such variations or modifications as well as others which may become apparent to those skilled in the art, are intended to be included within the scope of the invention as defined by the appended claims.

What is claimed is:

1. A method for automating work in process management of insurance receivable accounts with a computerized system comprising the steps of:

assigning automatically a collection strategy to a delinquent one of said insurance receivable accounts in said computerized system for assisting a collector in resolving said one of said insurance receivable accounts;

generating said collection strategy in consideration of an automated decision support for objectively evaluating data relating to any collection related decision for said one of said insurance receivable accounts; and, generating said collection strategy in consideration of a historical data warehouse storing all the tables and recorded transactions of all associated actions taken during the transaction life cycle of all said insurance receivable accounts stored in said computerized system for comparing said one of said insurance receivable accounts against prior insurance receivable accounts recorded in said data warehouse, said automated decision support and said historical data warehouse being mutually responsive to one another; and assigning said one of said insurance receivable accounts to a select recovery specialist based on said collection strategy, said automated decision support being responsive to said select recovery specialist.

2. The method of claim 1, wherein said insurance receivable accounts includes a case being at least one of a premium collection, claim subrogation, third party deductible, and reinsurance medical overpayment.

3. The method of claim 1, wherein said automated decision support helps said collector with decisions including at least one of referral to an outside collection agency, initiation of litigation, acceptance of a settlement, and creation of a charge off.

4. The method of claim 1, wherein actions associated with said collection strategy include at least one of letters, phone calls, collection agency referral, payment plan request, promissory note, referring to a manager, referring to an expert, request for disbursement, and referring to an attorney.

5. The method of claim 1, wherein said collection strategy is responsive to weight assignments based upon relative complexity, dollar value, specific steps to complete, and resources for assigning said one of said insurance receivable accounts to said collector.

6. The method of claim 5, wherein said collection strategy is responsive to an account profile and a customer profile of said one of said insurance receivable accounts.

7. The method of claim 6, wherein said automated decision support is responsive to said select recovery specialist.

8. The method of claim 7, further including the step of undertaking by said recovery specialist one of dispute resolution activities and litigation management activities for resolving said one of said insurance receivable accounts, said automated decision support being responsive to each of said dispute resolution activities and said litigation management activities.

9. The method of claim 8, wherein said dispute resolution activities include said recovery specialist negotiating with a debtor of said one of said insurance receivable accounts for settlement of said one of said insurance receivable accounts.

10. The method of claim 8, wherein said litigation management activities include selecting the most cost effective legal strategy and a lawyer for implementing said legal strategy.

11. The method of claim 8, further including the step of resolving said one of said insurance receivables from one of said dispute resolution activities and litigation management activities with one of a cash recovery, a charge-off, an adjustment, and a report of said resolution.

12. The method of claim 11, wherein said historical data warehouse is searched for optimal relationships between said account profile, customer profile, weight assignments, strategy assignments, litigation management activities, dispute resolution activities, recovery specialist assignments and resolutions for directing decisions to optimum outcome results.

13. A method for managing insurance receivable accounts with a computerized system comprising the steps of:

creating a historical data warehouse storing all the tables and recorded transactions of all associated actions taken during the transaction life cycle of all said premium receivable accounts stored in said computerized system for comparing one of said insurance receivable accounts against prior insurance receivable accounts recorded in said data warehouse;

providing an automated decision support for objectively evaluating data relating to any decision point for said one of said insurance receivable accounts, said historical data warehouse and said automated decision support being mutually responsive to one another;

generating a collection strategy assignment for resolving said one of said insurance premium collection accounts in consideration of a customer profile and an account profile of said one of said insurance receivable accounts, said collection strategy assignment being responsive to said historical data warehouse and said automated decision support;

assigning said one of said insurance receivable accounts based on said collection strategy assignment to a select recovery specialist for further activities upon said one of said insurance receivable accounts, said assigning to said select recovery specialist being responsive to said automated decision support, and a work queue assignment;

assigning said one of said insurance receivable accounts by said select recovery specialist for one of dispute resolution activities and litigation management activities, said dispute resolution activities and said litigation management activities being responsive to said automated decision support; and, resolving said one of said insurance receivable accounts from one of said dispute resolution and litigation management activities.

14. The method of claim 13, further including searching said historical data warehouse for optimal relationships between said account profile, customer profile, weight assignments, collection strategy assignments, litigation management activities, dispute resolution activities, recovery specialist assignments and resolution.

15. The method of claim 13, further including said collection strategy being responsive to a weight assignment for all said insurance receivables and actions taken on said one of said insurance receivable accounts for distributing workload in response to new referral activity for said insurance receivable accounts.

16. The method of claim 13, wherein said automated decision support includes supporting decisions on said one of said insurance premium collection accounts including at least one of referring to an outside collection agency, initiating litigation, accepting a settlement, and creating a charge-off.

17. The method of claim 13, wherein said automated decision support includes providing objective and quantifiable criteria for sending said one of said insurance receivable accounts to the most efficient, lowest cost alternative for resolving said one of said insurance receivable accounts.

18. The method of claim 13, further including the step of automatically performing a diagnostic analysis in conjunction with said historical data warehouse for extrapolating a most likely outcome resulting from executing any next contemplated step on said one of said insurance receivable accounts.

19. The method of claim 18, further including the step of deriving a predictive outcome value for optimizing resources to highest return activities for said one of said insurance receivable accounts.

20. The method of claim 19, wherein said predictive outcome value is a projected cost and benefit of successful executing said collection strategy to a predicted outcome, said predictive value outcome based on at least one of initial cost, expected external escalation costs, predetermined factors associated with said collection strategy, probability of success, and recovery time.

21. A computerized system for managing insurance receivable accounts comprising:

(a) a plurality of workstation processor means for individuals to utilize in managing said insurance receivable accounts;

(b) database processor means interconnected for storing predetermined data, said database processor means being interconnected and responsive to each of said plurality of workstation processor means;

(c) file processor means for storing and managing predetermined collections of data, said file processor means being interconnected and responsive to each of said plurality of workstation processor means;

(d) output means for producing documents in at least one of text, graphics, and electronic transfer mode, said output means being interconnected and responsive to each of said plurality of workstation processor means; and, (e) input means for receiving predetermined input into said computer system, said input means being interconnected and responsive to each of said plurality of workstation processor means; and, (f) software means for configuring each of said plurality of workstation processor means, database processor means, file processor means, output means, and input means for managing said insurance premium collection accounts, and wherein said software means includes collection strategy development means for managing said insurance receivable accounts.

22. The computerized system according to claim 21 wherein said software means includes electronic mail transmission of predetermined litigation related data to local counsel.

23. The computerized system according to claim 22, wherein said software means includes a predetermined collector queue process for implementing scripted dispute handling of said insurance receivable accounts.

24. The computerized system according to claim 23, wherein said software means includes litigation strategy development for said insurance receivable accounts referred to outside collection agencies and attorneys.

25. The computerized system according to claim 24, wherein said input means is a fax/modem and said software means includes electronic data transfer of predetermined information for said insurance receivable accounts referred to outside collection agencies and attorneys.

26. The computerized system according to claim 25, wherein said software means includes evaluation of next step to be undertaken for managing said insurance receivable accounts.

27. The computerized system according to claim 26, wherein said software means includes in-house attorney review and monitoring for said insurance receivable accounts referred to outside collection agencies and attorneys.

28. The computerized system according to claim 27, wherein said software means includes automated facsimile generation for managing said insurance receivable accounts.

29. The computerized system according to claim 28, wherein said predetermined input includes a bankruptcy database and said software means includes providing access to said bankruptcy database for managing said insurance receivable accounts referred to an outside attorney.

30. A method of managing insurance receivable accounts in a computerized system including workstations, a database server, a file server, output device and input device, said method comprising the steps of:
   (a) receiving collection referrals into said computerized system, said collection referrals being insurance premium collection accounts, said computerized system being configured by software means for managing said insurance receivable accounts;
   (b) processing each of said collection referrals that is an existing account in accord with a predetermined collector queue process in said computerized system;
   (c) processing each of said collection referrals that is a new account in accord with at least one of a predetermined regular in-house account process, predetermined special program account process, predetermined financially involved agent account process, predetermined retro account process, and predetermined bankruptcy debtor account process in said computerized system; and,
   (d) processing each of said regular in-house accounts in accord with at least one of a predetermined collector's queue process, predetermined collection agency and attorney referral process, and predetermined litigation process in said computerized system.

31. A method in accordance with claim 30 further including the step of combining all policies for the same insured under each of said collection referrals in said computerized system.

32. A method in accordance with claim 31 wherein said method includes automated generation of a collection strategy to guide a collector in managing said insurance receivable accounts.

33. A method in accordance with claim 32 wherein said method provides scripted dispute processing of said collection referrals.

34. A method in accordance with claim 33 wherein said method includes automation of evaluation of the next step to be undertaken in managing said insurance premium collection accounts.

35. A method in accordance with claim 34 further including automated litigation strategy development.

36. A method in accordance with claim 35 further including automated generation of sample complaints and pleadings.

37. A method in accordance with claim 36 further including automation of on site attorney monitoring till resolution of the case.

38. A method in accordance with claim 37 further including automated access to a bankruptcy data base.

39. A computerized system for managing insurance receivable accounts comprising:
   (a) a plurality of workstation processor means for collectors to respectively utilize in managing said insurance premium collection accounts;
   (b) database processor means interconnected for storing predetermined data, said database processor means being interconnected and responsive to each of said plurality of workstation processor means;
   (c) file processor means for storing and managing predetermined collections of data, said file processor means being interconnected and responsive to each of said plurality of workstation processor means;
   (d) output means for producing documents in at least one of text, graphics, and electronic transfer mode, said output means being interconnected and responsive to each of said plurality of workstation processor means; and,
   (e) input means for receiving predetermined input into said computer system, said input means being interconnected and responsive to each of said plurality of workstation processor means; and,
   (f) software means for configuring each of said plurality of workstation processor means, database processor means, file processor means, output means, and input means for work in process management of said insurance receivable accounts; wherein said software means includes predetermined file interface and processing, predetermined management statistics generation, predetermined collection accounts processing, predetermined report and automated letter generation, and predetermined remote site interface processing.

40. The computerized system according to claim 39, wherein said predetermined file and interface and processing includes downloading of predetermined data from other mainframe and LAN systems.

41. The computerized system according to claim 39, wherein said predetermined management statistics generation includes overnight creation of statistics needed for management operating statistics which can be accessed via on-line or in report format.

42. The computerized system according to claim 39, wherein said predetermined collection accounts processing includes predetermined manage collection and litigation strategies and assignments processing, predetermined manage collector queues processing, and predetermined workflow processing.

43. The computerized system according to claim 42, wherein said predetermined manage collection and litigation strategies and assignments processing includes on-line abilities to revise criteria for assignment of said collection and litigation strategies, add and delete collectors or managers to said computerized system, establish and change work flow parameters such as collector experience level, and management authorization to move or prioritize accounts.

44. The computerized system according to claim 42, wherein said predetermined manage collecting queues processing includes an on-line ability to prioritize an account for immediate attention by a collector or manager, and move one group of collection accounts from one collector's queue to another collector's queue.

45. The computerized system according to claim 42, wherein said predetermined workflow processing includes predetermined collector processing, predetermined manager processing and predetermined miscellaneous processing.

46. The computerized system according to claim 45, wherein said predetermined collector processing includes the capability for a collector to receive prompts generated by said computerized system indicating the next activity to be taken, and the capability for said collector to follow any scripting which the collection strategy deems necessary to expedite one of said insurance receivable accounts.

47. The computerized system according to claim 45, wherein said predetermined manager processing includes said predetermined collector processing, the ability to override a collection strategy for one of said insurance receivable accounts, and the ability to review a document referred by a collector for approval and send back said document to said collector with a response.

* * * * *